(12) United States Patent
Gallagher et al.

(10) Patent No.: US 7,574,213 B2
(45) Date of Patent: *Aug. 11, 2009

(54) APPARATUS FOR SUPPORTING THE HANDOVER OF A TELECOMMUNICATION SESSION BETWEEN A LICENSED WIRELESS SYSTEM AND AN UNLICENSED WIRELESS SYSTEM

(75) Inventors: Michael D. Gallagher, San Jose, CA (US); Jahangir Mohammed, Mountain View, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/933,386

(22) Filed: Oct. 31, 2007

(65) Prior Publication Data

US 2008/0119187 A1 May 22, 2008

Related U.S. Application Data

(63) Continuation of application No. 10/251,901, filed on Sep. 20, 2002, now Pat. No. 7,308,263, and a continuation-in-part of application No. 10/116,311, filed on Apr. 2, 2002, and a continuation-in-part of application No. 10/116,023, filed on Apr. 2, 2002, and a continuation-in-part of application No. 10/115,833, filed on Apr. 2, 2002, now Pat. No. 6,922,559, and a continuation-in-part of application No. 10/115,767, filed on Apr. 2, 2002, and a continuation-in-part of application No. 10/115,835, filed on Apr. 2, 2002, and a continuation-in-part of application No. 10/116,186, filed on Apr. 2, 2002, and a continuation-in-part of application No. 10/115,774, filed on Apr. 2, 2002, now Pat. No. 6,647,426, which is a continuation of application No. 09/912,047, filed on Jul. 24, 2001, now abandoned, and a continuation of application No. 09/912,881, filed on Jul. 24, 2001, now abandoned, and a continuation of application No. 09/912,789, filed on Jul. 24, 2001, now abandoned, and a continuation of application No. 09/912,882, filed on Jul. 24, 2001, now abandoned, and a continuation of application No. 09/912,883, filed on Jul. 24, 2001, now abandoned, and a continuation of application No. 09/912,807, filed on Jul. 24, 2001, now abandoned, and a continuation of application No. 09/912,884, filed on Jul. 24, 2001, now abandoned.

(60) Provisional application No. 60/271,767, filed on Feb. 26, 2001, provisional application No. 60/271,768, filed on Feb. 26, 2001, provisional application No. 60/271,769, filed on Feb. 26, 2001, provisional application No. 60/271,766, filed on Feb. 26, 2001, provisional application No. 60/324,157, filed on Sep. 20, 2001.

(51) Int. Cl.
*H04Q 7/20* (2006.01)

(52) U.S. Cl. .................... 455/439; 455/438; 455/552.1; 370/331; 370/338

(58) Field of Classification Search ................. 455/439, 455/438, 552.1; 370/331, 338
See application file for complete search history.

(56) References Cited

U.S. PATENT DOCUMENTS

| | | | |
|---|---|---|---|
| 5,101,501 | A | 3/1992 | Gilhousen et al. |
| 5,109,528 | A | 4/1992 | Uddenfeldt |
| 5,226,045 | A | 7/1993 | Chuang |
| 5,235,632 | A | 8/1993 | Raith |
| 5,260,944 | A | 11/1993 | Tomabechi |
| 5,260,988 | A | 11/1993 | Schellinger |
| 5,267,261 | A | 11/1993 | Blakeney |
| 5,327,578 | A | 7/1994 | Breeden et al. |
| 5,333,175 | A | 7/1994 | Ariyavisitakul |
| 5,367,558 | A | 11/1994 | Gillig |
| 5,390,233 | A | 2/1995 | Jensen |
| 5,392,331 | A | 2/1995 | Patsiokas |
| 5,406,615 | A | 4/1995 | Miller |
| 5,428,601 | A | 6/1995 | Owen |
| 5,442,680 | A | 8/1995 | Schellinger |
| 5,448,619 | A | 9/1995 | Evans et al. |
| 5,475,677 | A | 12/1995 | Arnold et al. |

| Patent No. | Date | Name | | Patent No. | Date | Name |
|---|---|---|---|---|---|---|
| 5,488,649 A | 1/1996 | Schellinger | | 6,445,921 B1 | 9/2002 | Bell |
| 5,507,035 A | 4/1996 | Bantz | | 6,463,307 B1 | 10/2002 | Larsson et al. |
| 5,509,052 A | 4/1996 | Chia et al. | | 6,498,934 B1 | 12/2002 | Muller |
| 5,515,420 A | 5/1996 | Urasaka et al. | | 6,539,237 B1 | 3/2003 | Sayers et al. |
| 5,533,027 A | 7/1996 | Akerberg et al. | | 6,542,516 B1 | 4/2003 | Vialen et al. |
| 5,594,782 A | 1/1997 | Zicker | | 6,553,219 B1 | 4/2003 | Vilander et al. |
| 5,610,969 A | 3/1997 | McHenry | | 6,553,232 B1 * | 4/2003 | Shaffer et al. ............... 455/440 |
| 5,634,193 A | 5/1997 | Ghisler | | 6,556,822 B1 | 4/2003 | Matsumoto |
| 5,640,414 A | 6/1997 | Blakeney | | 6,556,825 B1 | 4/2003 | Mansfield |
| 5,659,598 A | 8/1997 | Byrne | | 6,556,830 B1 | 4/2003 | Lenzo |
| 5,659,878 A | 8/1997 | Uchida et al. | | 6,574,266 B1 | 6/2003 | Haartsen |
| 5,664,005 A | 9/1997 | Emery | | 6,587,444 B1 | 7/2003 | Lenzo |
| 5,673,307 A | 9/1997 | Holland | | 6,600,925 B1 | 7/2003 | Rams |
| 5,675,629 A | 10/1997 | Raffel | | 6,603,965 B1 * | 8/2003 | Dinkin ...................... 455/416 |
| 5,724,658 A | 3/1998 | Hasan | | 6,633,614 B1 | 10/2003 | Barton et al. |
| 5,732,076 A | 3/1998 | Ketseoglou | | 6,633,761 B1 | 10/2003 | Singhal |
| 5,745,852 A | 4/1998 | Khan | | 6,643,512 B1 | 11/2003 | Ramaswamy |
| 5,758,281 A | 5/1998 | Emery | | 6,647,426 B2 | 11/2003 | Mohammed |
| 5,796,727 A | 8/1998 | Harrison | | 6,658,250 B1 | 12/2003 | Ganesan |
| 5,796,729 A | 8/1998 | Greaney | | 6,665,276 B1 | 12/2003 | Culbertrson |
| 5,812,522 A | 9/1998 | Lee et al. | | 6,675,009 B1 | 1/2004 | Cook |
| 5,815,525 A | 9/1998 | Smith et al. | | 6,680,923 B1 | 1/2004 | Leon |
| 5,818,820 A | 10/1998 | Anderson | | 6,711,400 B1 | 3/2004 | Aura |
| 5,822,681 A | 10/1998 | Chang | | 6,766,160 B1 | 7/2004 | Lemilainen |
| 5,822,767 A | 10/1998 | MacWilliams et al. | | 6,788,656 B1 | 9/2004 | Smolentzov |
| 5,825,759 A | 10/1998 | Liu | | 6,801,519 B1 | 10/2004 | Mangel |
| 5,852,767 A | 12/1998 | Sugita | | 6,801,772 B1 * | 10/2004 | Townend et al. ............ 455/436 |
| 5,862,345 A | 1/1999 | Okanoue et al. | | 6,801,777 B2 | 10/2004 | Rusch |
| 5,870,677 A | 2/1999 | Takahashi et al. | | 6,807,417 B2 | 10/2004 | Sallinen |
| 5,887,020 A | 3/1999 | Smith | | 6,824,048 B1 | 11/2004 | Itabashi |
| 5,887,260 A | 3/1999 | Nakata | | 6,826,154 B2 | 11/2004 | Subbiah et al. |
| 5,890,055 A | 3/1999 | Chu | | 6,829,227 B1 | 12/2004 | Pitt |
| 5,890,064 A | 3/1999 | Widergen | | 6,842,462 B1 | 1/2005 | Ramjee et al. |
| 5,903,834 A | 5/1999 | Wallstedt | | 6,845,095 B2 | 1/2005 | Krishnarajah et al. |
| 5,915,224 A | 6/1999 | Jonsson | | 6,850,503 B2 | 2/2005 | Dorenbosch et al. |
| 5,926,760 A | 7/1999 | Khan | | 6,853,851 B1 | 2/2005 | Rautiola et al. |
| 5,936,949 A | 8/1999 | Pasternak | | 6,879,600 B1 | 4/2005 | Jones et al. |
| 5,940,512 A | 8/1999 | Tomoike | | 6,895,255 B1 | 5/2005 | Bridgelall |
| 5,946,622 A | 8/1999 | Bojeryd | | 6,909,705 B1 | 6/2005 | Lee et al. |
| 5,949,773 A | 9/1999 | Bhalla et al. | | 6,925,074 B1 | 8/2005 | Vikberg et al. |
| 5,960,341 A | 9/1999 | LeBlanc | | 6,937,862 B2 | 8/2005 | Back et al. |
| 5,960,361 A | 9/1999 | Chen | | 6,957,249 B2 | 10/2005 | Salo |
| 5,960,364 A | 9/1999 | Dent | | 6,961,573 B1 | 11/2005 | Moon et al. |
| 5,987,010 A | 11/1999 | Schnizlein | | 6,970,719 B1 | 11/2005 | McConnell et al. |
| 5,995,828 A | 11/1999 | Nishida | | 6,993,359 B1 | 1/2006 | Nelakanti et al. |
| 6,016,318 A | 1/2000 | Tomoike | | 7,009,952 B1 | 3/2006 | Razavilar et al. |
| 6,035,193 A | 3/2000 | Buhrmann | | 7,035,932 B1 | 4/2006 | Dowling |
| 6,052,592 A | 4/2000 | Schellinger | | 7,039,027 B2 | 5/2006 | Bridgelall |
| 6,101,176 A | 8/2000 | Honkasalo et al. | | 7,043,235 B2 | 5/2006 | Meyer et al. |
| 6,112,080 A | 8/2000 | Anderson | | 7,054,290 B1 | 5/2006 | Djuphammar |
| 6,112,088 A * | 8/2000 | Haartsen ..................... 455/437 | | 7,065,353 B1 | 6/2006 | Bolinth et al. |
| 6,115,608 A | 9/2000 | Duran et al. | | 7,149,521 B2 | 12/2006 | Sundar et al. |
| 6,119,000 A | 9/2000 | Stephenson et al. | | 7,251,227 B2 | 7/2007 | de Jong et al. |
| 6,130,886 A | 10/2000 | Ketseoglou | | 7,283,823 B2 | 10/2007 | Pearce et al. |
| 6,134,227 A | 10/2000 | Magana | | 7,308,263 B2 | 12/2007 | Gallagher et al. |
| 6,138,019 A | 10/2000 | Trompower | | 2001/0029186 A1 | 10/2001 | Canyon |
| 6,226,515 B1 | 5/2001 | Pauli et al. | | 2001/0031645 A1 | 10/2001 | Jarrett |
| 6,229,792 B1 | 5/2001 | Anderson et al. | | 2001/0046214 A1 | 11/2001 | Kang |
| 6,236,852 B1 | 5/2001 | Veerasamy et al. | | 2001/0046860 A1 | 11/2001 | Lee |
| 6,243,581 B1 | 6/2001 | Jawanda | | 2001/0049790 A1 | 12/2001 | Faccin et al. |
| 6,256,511 B1 | 7/2001 | Brown et al. | | 2002/0003789 A1 * | 1/2002 | Kim et al. .................... 370/338 |
| 6,263,211 B1 | 7/2001 | Brunner | | 2002/0045459 A1 | 4/2002 | Morikawa |
| 6,269,086 B1 | 7/2001 | Magana | | 2002/0065099 A1 | 5/2002 | Bjorndahl |
| 6,320,873 B1 | 11/2001 | Nevo | | 2002/0066036 A1 | 5/2002 | Makineni |
| 6,327,470 B1 | 12/2001 | Ostling | | 2002/0075844 A1 | 6/2002 | Hagen |
| 6,359,872 B1 | 3/2002 | Mahany | | 2002/0082015 A1 | 6/2002 | Wu |
| 6,374,102 B1 | 4/2002 | Brachman | | 2002/0085516 A1 | 7/2002 | Bridgelall |
| 6,381,457 B1 | 4/2002 | Carlsson | | 2002/0102974 A1 | 8/2002 | Raith |
| 6,389,059 B1 | 5/2002 | Smith | | 2002/0118674 A1 | 8/2002 | Faccin et al. |
| 6,415,158 B1 | 7/2002 | King | | 2002/0131387 A1 | 9/2002 | Pitcher et al. |
| 6,426,819 B1 | 7/2002 | Crimmins et al. | | 2002/0132630 A1 | 9/2002 | Arazi |
| 6,430,395 B2 | 8/2002 | Arazi et al. | | 2002/0142761 A1 | 10/2002 | Wallstedt |
| 6,438,117 B1 | 8/2002 | Grilli et al. | | 2002/0147008 A1 * | 10/2002 | Kallio ........................ 455/426 |

| | | | | | | |
|---|---|---|---|---|---|---|
| 2002/0147016 A1 | 10/2002 | Arazi | | 2007/0268855 A1 | 11/2007 | Grayson et al. |
| 2002/0155829 A1 | 10/2002 | Proctor et al. | | 2007/0287459 A1 | 12/2007 | Diachina et al. |
| 2002/0160811 A1 | 10/2002 | Jannette et al. | | 2007/0293222 A1 | 12/2007 | Vikberg et al. |
| 2002/0166068 A1 | 11/2002 | Kilgore | | 2008/0123596 A1 | 5/2008 | Gallagher et al. |
| 2002/0168959 A1 | 11/2002 | Noguchi et al. | | 2008/0132207 A1 | 6/2008 | Gallagher et al. |
| 2002/0186684 A1 | 12/2002 | Shaughnessy et al. | | | | |
| 2002/0191575 A1 | 12/2002 | Kalavade et al. | | | | |
| 2002/0196840 A1 | 12/2002 | Anderson | | | | |
| 2002/0197984 A1 | 12/2002 | Monin et al. | | | | |
| 2003/0007475 A1 | 1/2003 | Tsuda et al. | | | | |
| 2003/0026269 A1 | 2/2003 | Paryani | | | | |
| 2003/0031151 A1 | 2/2003 | Sharma et al. | | | | |
| 2003/0043773 A1 | 3/2003 | Chang | | | | |
| 2003/0087653 A1 | 5/2003 | Leung | | | | |
| 2003/0112789 A1 | 6/2003 | Heinonen | | | | |
| 2003/0119490 A1 | 6/2003 | Mohammed | | | | |
| 2003/0119527 A1 | 6/2003 | Labun et al. | | | | |
| 2003/0119548 A1 | 6/2003 | Mohammed | | | | |
| 2003/0130008 A1 | 7/2003 | Rajaniemi et al. | | | | |
| 2003/0139180 A1 | 7/2003 | McIntosh et al. | | | | |
| 2003/0142673 A1 | 7/2003 | Patil et al. | | | | |
| 2003/0165124 A1 * | 9/2003 | Alperovich et al. ......... 370/331 | | | | |
| 2003/0172264 A1 | 9/2003 | Dillon | | | | |
| 2003/0176181 A1 | 9/2003 | Boesjes | | | | |
| 2003/0176186 A1 | 9/2003 | Mohammed | | | | |
| 2003/0193952 A1 | 10/2003 | O'Neill | | | | |
| 2003/0202486 A1 | 10/2003 | Anton, Jr. et al. | | | | |
| 2003/0210199 A1 | 11/2003 | Sward et al. | | | | |
| 2003/0219022 A1 | 11/2003 | Dillon et al. | | | | |
| 2003/0219024 A1 | 11/2003 | Purnadi et al. | | | | |
| 2003/0226017 A1 | 12/2003 | Palekar et al. | | | | |
| 2004/0008649 A1 | 1/2004 | Wybenga et al. | | | | |
| 2004/0009749 A1 | 1/2004 | Arazi et al. | | | | |
| 2004/0013099 A1 | 1/2004 | O'Neill | | | | |
| 2004/0025018 A1 | 2/2004 | Haas | | | | |
| 2004/0037312 A1 | 2/2004 | Spear | | | | |
| 2004/0053623 A1 | 3/2004 | Hoff et al. | | | | |
| 2004/0068571 A1 | 4/2004 | Ahmavaara | | | | |
| 2004/0068653 A1 | 4/2004 | Fascenda | | | | |
| 2004/0072593 A1 | 4/2004 | Robbins et al. | | | | |
| 2004/0077346 A1 | 4/2004 | Krenik et al. | | | | |
| 2004/0077354 A1 | 4/2004 | Jason et al. | | | | |
| 2004/0077355 A1 | 4/2004 | Krenik et al. | | | | |
| 2004/0077356 A1 | 4/2004 | Krenik et al. | | | | |
| 2004/0077374 A1 | 4/2004 | Terry | | | | |
| 2004/0147223 A1 | 7/2004 | Cho | | | | |
| 2004/0171378 A1 | 9/2004 | Rautila | | | | |
| 2004/0202132 A1 | 10/2004 | Heinonen | | | | |
| 2004/0203346 A1 | 10/2004 | Myhre et al. | | | | |
| 2004/0203737 A1 | 10/2004 | Myhre et al. | | | | |
| 2004/0203788 A1 | 10/2004 | Fors et al. | | | | |
| 2004/0203800 A1 | 10/2004 | Myhre et al. | | | | |
| 2004/0203815 A1 | 10/2004 | Shoemake et al. | | | | |
| 2005/0064896 A1 | 3/2005 | Rautiola et al. | | | | |
| 2005/0070288 A1 | 3/2005 | Belkin et al. | | | | |
| 2005/0101245 A1 | 5/2005 | Ahmavaara | | | | |
| 2005/0101329 A1 | 5/2005 | Gallagher | | | | |
| 2005/0198199 A1 | 9/2005 | Dowling | | | | |
| 2005/0239441 A1 | 10/2005 | Eronen | | | | |
| 2005/0239453 A1 | 10/2005 | Vikberg et al. | | | | |
| 2005/0239468 A1 | 10/2005 | Segal | | | | |
| 2005/0266853 A1 | 12/2005 | Gallagher | | | | |
| 2005/0272425 A1 | 12/2005 | Amerga et al. | | | | |
| 2006/0019667 A1 | 1/2006 | Hicks, III | | | | |
| 2006/0094431 A1 | 5/2006 | Saifullah et al. | | | | |
| 2006/0098598 A1 | 5/2006 | Gallagher | | | | |
| 2006/0146803 A1 | 7/2006 | Bae et al. | | | | |
| 2006/0148511 A1 | 7/2006 | Bender et al. | | | | |
| 2006/0183482 A1 | 8/2006 | Ueda | | | | |
| 2006/0189319 A1 | 8/2006 | Houldsworth et al. | | | | |
| 2006/0223532 A1 | 10/2006 | Liu et al. | | | | |
| 2006/0268845 A1 | 11/2006 | He et al. | | | | |
| 2007/0232312 A1 | 10/2007 | Gallagher et al. | | | | |

FOREIGN PATENT DOCUMENTS

| | | |
|---|---|---|
| EP | 0936777 | 8/1999 |
| EP | 1207708 | 5/2002 |
| GB | 2282735 | 4/1995 |
| WO | WO 9204796 | 3/1992 |
| WO | WO 9724004 | 3/1997 |
| WO | WO 9948312 | 9/1999 |
| WO | WO 9948315 | 9/1999 |
| WO | WO 0028762 | 5/2000 |
| WO | WO 0051387 | 8/2000 |
| WO | WO 0245456 | 6/2002 |
| WO | WO 03039009 | 5/2003 |
| WO | WO 03/085992 | 10/2003 |
| WO | WO 03092312 | 11/2003 |
| WO | WO 2004002051 | 12/2003 |
| WO | WO 2004034219 | 4/2004 |
| WO | WO 2004039111 | 5/2004 |
| WO | WO 2005006597 | 1/2005 |
| WO | WO 2005/057968 | 6/2005 |
| WO | WO 2005/120017 | 12/2005 |
| WO | WO 2006/053102 | 5/2006 |
| WO | WO 2008055251 | 5/2008 |

OTHER PUBLICATIONS

Non-Final Office Action for U.S. Appl. No. 10/251,901, May 5, 2005 (mailing date), Mohammed, Jahangir.
Non-Final Office Action for U.S. Appl. No. 10/251,901, Aug. 9, 2006 (mailing date), Mohammed, Jahangir.
Notice of Allowance of U.S. Appl. No. 10/251,901, Jun. 12, 2007 (mailing date), Gallagher, Michael, et al.
Supplemental Notice of Allowance of U.S. Appl. No. 10/251,901, Jul. 24, 2007 (mailing date), Gallagher, Michael, et al.
Supplemental Notice of Allowance of U.S. Appl. No. 10/251,901, Aug. 14, 2007 (mailing date), Gallagher, Michael, et al.
Supplemental Notice of Allowance of U.S. Appl. No. 10/251,901, Sep. 10, 2007 (mailing date), Gallagher, Michael, et al.
Non-Final Office Action of U.S. Appl. No. 10/116,311, Feb. 9, 2006 (mailing date), Mohammed, Jahangir.
Non-Final Office Action of U.S. Appl. No. 10/116,311, Sep. 7, 2006 (mailing date), Mohammed, Jahangir.
Non-Final Office Action of U.S. Appl. No. 10/116,311, Mar. 6, 2007 (mailing date), Mohammed, Jahangir.
Final Office Action of U.S. Appl. No. 10/116,311, Aug. 24, 2007 (mailing date), Mohammed, Jahangir.
Non-Final Office Action of U.S. Appl. No. 10/116,311, May 12, 2008 (mailing date), Mohammed, Jahangir.
Non-Final Office Action of U.S. Appl. No. 10/116,186, Nov. 16, 2005 (mailing date), Mohammed, Jahangir.
Final Office Action of U.S. Appl. No. 10/116,186, Feb. 1, 2006 (mailing date), Mohammed, Jahangir.
Non-Final Office Action of U.S. Appl. No. 10/116,186, Oct. 2, 2006 (mailing date), Mohammed, Jahangir.
Non-Final Office Action of U.S. Appl. No. 10/116,186, Aug. 10, 2007 (mailing date), Mohammed, Jahangir.
Non-Final Office Action of U.S. Appl. No. 10/116,186, Apr. 4, 2008 (mailing date), Mohammed, Jahangir.
Non-Final Office Action of U.S. Appl. No. 10/115,767, Dec. 22, 2005 (mailing date), Mohammed, Jahangir.
Restriction Requirement of U.S. Appl. No. 10/115,767, Jun. 13, 2006 (mailing date), Mohammed, Jahangir.
Final Office Action of U.S. Appl. No. 10/115,767, Jul. 27, 2006 (mailing date), Mohammed, Jahangir.
Non-Final Office Action of U.S. Appl. No. 10/115,767, Jun. 14, 2007 (mailing date), Mohammed, Jahangir.
Non-Final Office Action of U.S. Appl. No. 11/004,439, Sep. 21, 2005 (mailing date), Gallagher, Michael.

Non-Final Office Action of U.S. Appl. No. 11/004,439, Apr. 21, 2006 (mailing date), Gallagher, Michael.
Non-Final Office Action of U.S. Appl. No. 11/004,439, Jan, 12, 2007 (mailing date), Gallagher, Michael.
Non-Final Office Action of U.S. Appl. No. 11/004,439, Jun. 8, 2007 (mailing date), Gallagher, Michael.
Non-Final Office Action of U.S. Appl. No. 11/004,439, Nov. 28, 2007 (mailing date), Gallagher, Michael.
Non-Final Office Action of U.S. Appl. No. 11/004,439, Jun. 9, 2008 (mailing date), Gallagher, Michael.
Non-Final Office Action of U.S. Appl. No. 11/129,424, May 1, 2008 (mailing date), Gallagher, Michael, et al.
Non-Final Office Action of U.S. Appl. No. 11/029,947, Mar. 6, 2008 (mailing date), Gallagher, Michael.
Non-Final Office Action of U.S. Appl. No. 11/029,947, Oct. 3, 2008 (mailing date), Gallagher, Michael.
Non-Final Office Action of U.S. Appl. No. 11/927,670, Aug. 25, 2008 (mailing date), Gallagher, et al.
International Search Report for PCT/US2003/004485, May 20, 2003 (mailing date), Kineto Wireless, Inc.
International Search Report and Written Opinion for PCT/US2004/040858, Apr. 26, 2005 (mailing date), Kineto Wireless, Inc.
International Preliminary Report on Patentability and Written Opinion for PCT/US2004/040858, Jun. 15, 2006 (mailing date), Kineto Wireless, Inc.
International Search Report and Written Opinion of the International Searching Authority for PCT/US2004/015940, Mar. 4, 2005 (mailing date), Kineto Wireless, Inc.
International Preliminary Report on Patentability for PCT/US2004/015940, Nov. 30, 2006 (mailing date), Kineto Wireless, Inc.
International Search Report and Written Opinion for PCT/US2005/040689, Mar. 13, 2006 (mailing date), Kineto Wireless, Inc.
International Preliminary Report on Patentability and Written Opinion for PCT/US2005/040689, May 15, 2007 (issuance date), Kineto Wireless, Inc.
International Search Report and Written Opinion for PCT/US2007/083266, Apr. 2, 2008 (mailing date), Kineto Wireless, Inc.
*Digital Enhanced Cordless Telecommunications (DECT); Global System for Mobile Communications (GSM); DECT/GSM Interworking Profile (IWP); Access and Mapping* (protocol/procedure description for 3, 1 kHz speech service): ETSI EN 300 370 V1.3.1 European Standard (Telecommunications Series), European Telecommunications Standards Institute, Sophia Antipolis, FR, Jan. 2001, 110 pages.
*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999, 23 pages.
*Digital Enhanced Cordless Telecommunications (DECT); DECT/UMTS Interworking Profile (IWP); Part 1: General Description and Overview*: ETSI TS 101 863-1 V1.1.2, Technical Specification, European Telecommunications Standards Institute, Sophia Antipolis, FR, Nov. 2001, 38 pages.
*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.

*Erricson Press Release*: "Ericsson presents the Mobile@Hometm concept," Mar. 21, 2001, printed Jan. 6, 2004, pp. 1-2.
Claus Lindholt Hansen et al., "Mobile@Home- a New 1 Use Case for Bluetooth in the Access Network," *LM Ericsson Business Unit Multi-Service Networks*, ISSLS 2002, Apr. 14-18, 2002, Seoul, Korea, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C. et al., "Intelligent Handoff for Mobile Wireless Internet," *Mobile Networks and Applications*, 6, 2001 Kluwer Academic Publishers, Manufactured in the Netherlands, Jan. 2001, pp. 67-79, printed Oct. 26, 2004.
ETSI TS 124 008 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0 Release 5); ETSI Standards, European Telecommunications Standards Institute, Sophia-Antipolis, FR, Dec. 2002, pp. 293-317.
"$3^{rd}$ Generation Partnership Project; Technical Specification Group Services and Ssytem Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.

\* cited by examiner

*Primary Examiner*—Danh C Le
(74) *Attorney, Agent, or Firm*—Adeli & Tollen LLP

(57) ABSTRACT

The invention discloses a wireless communication handset comprising licensed wireless communication signal processing circuitry and unlicensed wireless communication signal processing circuitry. The invention further discloses a control circuit connected to both the licensed wireless communication signal processing circuitry and the unlicensed wireless communication signal processing circuitry, and a computer readable memory for directing the control circuit to function in a specified manner. This memory includes instructions to formulate a measurement report containing signal strength information that corresponds to the strength of a signal received through the unlicensed wireless communication signal processing circuitry. The measurement report also contains a request to transfer a wireless communication session from a licensed wireless system to an unlicensed wireless system. The memory further includes instructions to transmit the measurement report to the licensed wireless system through the licensed wireless communication signal processing circuitry.

16 Claims, 18 Drawing Sheets

US 7,574,213 B2

APPARATUS FOR SUPPORTING THE HANDOVER OF A TELECOMMUNICATION SESSION BETWEEN A LICENSED WIRELESS SYSTEM AND AN UNLICENSED WIRELESS SYSTEM

CLAIM OF BENEFIT TO PRIOR APPLICATIONS

This application is a continuation application of U.S. Non-Provisional patent application Ser. No. 10/251,901, entitled "Apparatus for Supporting the Handover of a Telecommunication Session Between a Licensed Wireless System and an Unlicensed Wireless System" which was filed on Sep. 20, 2002 now U.S. Pat. No. 7,308,263. U.S. application Ser. No. 10/251,901 claims priority to provisional patent application 60/324,157, which was filed on Sep. 20, 2001. U.S. application Ser. No. 10/251,901 is also a continuation-in-part of and claims priority to U.S. patent applications Ser. Nos. 10/116,311; 10/116,023; 10/115,833 now U.S. Pat. No. 6,922,559; U.S. patent application Ser. Nos. 10/115,767; 10/115,835; 10/116,186; and 10/115,774 now U.S. Pat. No. 6,647,426, each of which was filed on Apr. 2, 2002. U.S. application Ser. No. 10/116,311 Apr. 2, 2002 is a continuation of U.S. application Ser. No. 09/912,047 which was filed on Jul. 24, 2001 now abandoned; U.S. application Ser. No. 10/115,767 is a continuation of U.S. application Ser. No. 09/912,881 which was filed on Jul. 24, 2001 now abandoned; U.S. application Ser. No. 10/116,023 is a continuation of U.S. application Ser. No. 09/912,789 which was filed on Jul. 24, 2001 now abandoned; U.S. application Ser. No. 10/115,835 is a continuation of U.S. application Ser. No. 09/912,882 which was filed on Jul. 24, 2001; U.S. application Ser. No. 10/116,186 is a continuation of U.S. application Ser. No. 09/912,883 which was filed on Jul. 24, 2001 now abandoned; U.S. application Ser. No. 10/115,833 is a continuation of U.S. application Ser. No. 09/912,807 which was filed on Jul. 24, 2001 now abandoned; U.S. application Ser. No. 10/115,774 Apr. 2, 2002 now U.S. Pat. No. 6,647,426 is a continuation of U.S. application Ser. No. 09/912,884 Jul. 24, 2001 now abandoned which was filed on Jul. 24, 2001 now abandoned. Each of applications Ser. Nos. 09/912,047, 09/912,881, 09/912,789, 09/912,882, 09/912,883, 09/912,807, and 09/912,884 claims priority to the following provisional patent applications: 60/271,766; 60/271,767; 60/271,768; and 60/271,769, each of which was filed on Feb. 26, 2001. All of the above-mentioned applications are incorporated herein by reference.

BRIEF DESCRIPTION OF THE INVENTION

This invention relates generally to telecommunications. More particularly, this invention relates to a technique for supporting the handover of voice and data telecommunication services between licensed and unlicensed wireless systems.

BACKGROUND OF THE INVENTION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station equipment is used to support communications on licensed frequencies. Base stations are typically installed approximately a mile apart from one another. As a result, the quality of service (voice quality and speed of data transfer) in wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required. Currently, unlicensed wireless communication systems are deployed to increase the mobility of an individual using a landline. The mobility range associated with such systems is typically on the order of 100 meters. A common unlicensed wireless communication system includes a base station with a physical connection to a landline. The base station has a RF transceiver to facilitate communication with a wireless handset that is operative within a modest distance of the base station. Thus, this option provides higher quality services at a lower cost, but the services only extend a modest distance from the base station.

Thus, there are significant shortcomings associated with current landline systems and licensed wireless systems. For this reason, individuals commonly have one telephone number for landline communications and one telephone number for licensed wireless communications. This leads to additional expense and inconvenience for an individual. It would be highly desirable if an individual could utilize a single telephone number for both landline communications and licensed wireless communications. Ideally, such a system would allow an individual, through seamless handovers between the two systems, to exploit the benefits of each system.

SUMMARY OF THE INVENTION

The invention discloses a wireless communication handset comprising licensed wireless communication signal processing circuitry and unlicensed wireless communication signal processing circuitry. The invention further discloses a control circuit connected to both the licensed wireless communication signal processing circuitry and the unlicensed wireless communication signal processing circuitry, and a computer readable memory for directing the control circuit to function in a specified manner. This memory includes instructions to formulate a measurement report containing signal strength information that corresponds to the strength of a signal received through the unlicensed wireless communication signal processing circuitry. The measurement report also contains a request to transfer a wireless communication session from a licensed wireless system to an unlicensed wireless system. The memory further includes instructions to transmit the measurement report to the licensed wireless system through the licensed wireless communication signal processing circuitry.

The invention further discloses a subscriber device comprising licensed wireless communication signal processing circuitry and unlicensed wireless communication signal processing circuitry. Also disclosed is a control circuit connected to both the licensed wireless communication signal processing circuitry and the unlicensed wireless communication signal processing circuitry, and a computer readable memory for directing the control circuit to function in a specified manner. This memory includes instructions to receive, through the unlicensed wireless communication signal processing circuitry, frequency information from a licensed wireless system, where this frequency information identifies an unlicensed radio frequency. The memory also includes instructions to monitor this unlicensed radio frequency for a signal from an unlicensed wireless system, and instructions to determine signal strength information corresponding to the strength of the signal. Further included are instructions to transmit this signal strength information through the licensed wireless communication signal processing circuitry to the licensed wireless system, so as to facilitate the linking of the communication session to the subscriber device through the unlicensed wireless system.

BRIEF DESCRIPTION OF THE DRAWINGS

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
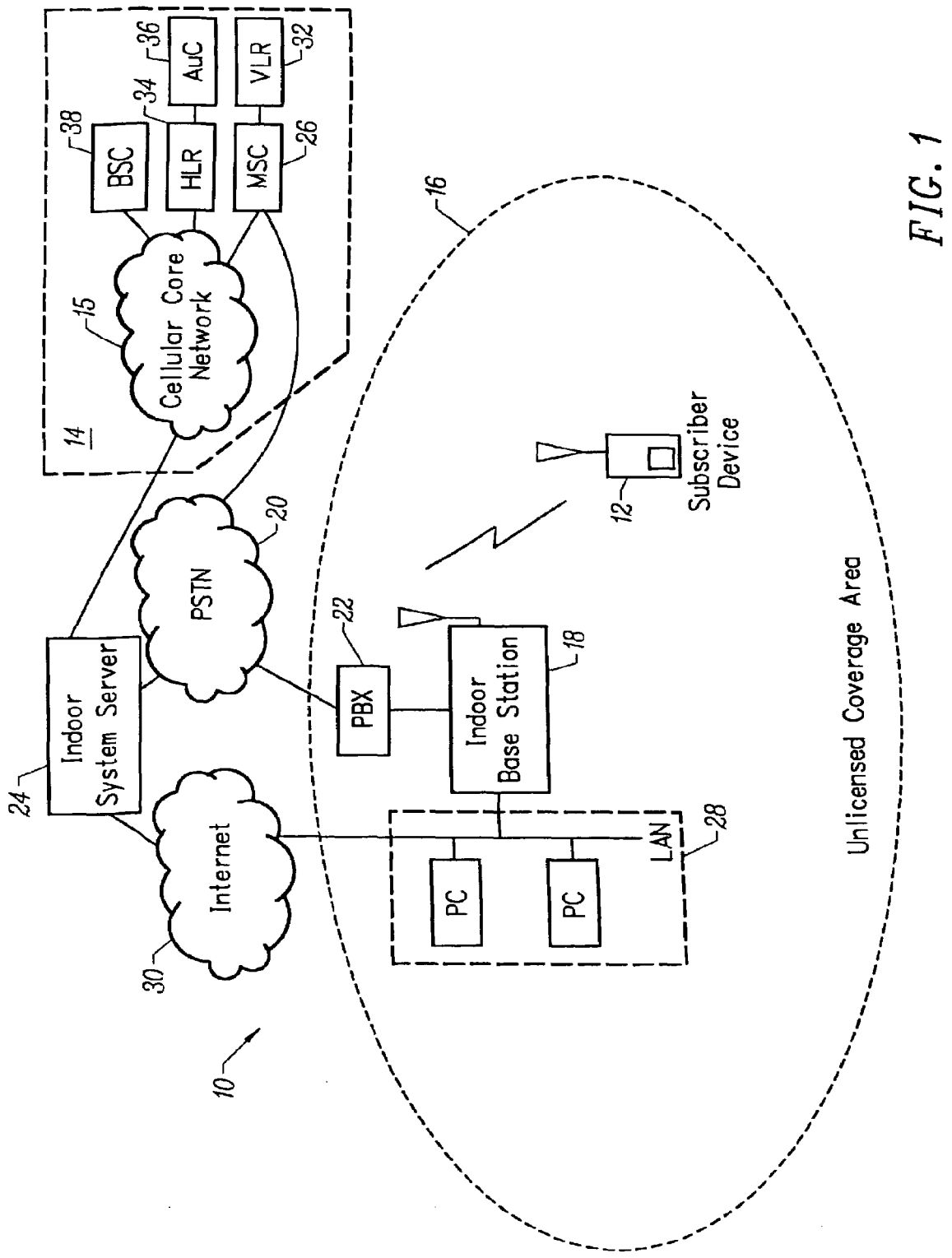
FIG. 1 illustrates an apparatus for integrating a licensed wireless system and an unlicensed wireless system in accordance with an embodiment of the invention.

FIG. 1 illustrates a system 10 that may be operated in accordance with an embodiment of the present invention. The system 10 includes a subscriber device 12, which is a wireless transceiver, such as a cellular telephone, a PCS telephone, a wireless data modem and the like. This subscriber device 12 is in wireless electronic communication with a cellular network 14, which provides licensed wireless service in the form of voice or data services. When the device 12 is within an unlicensed wireless service coverage area 16, the licensed wireless service is substituted without interruption for an unlicensed wireless service that is facilitated through a base station 18.

The base station 18 wirelessly transmits telephone signals from a standard Public Switched Telephone Network (PSTN) 20 and, if necessary, a standard Private Branch exchange (PBX) 22, to a subscriber device 12. The base station 18 also assists in handing off telephone service to the device 12. Specifically, when a device 12 is within an unlicensed wireless service coverage area 16, the originating base station 18 provides the device 12 with wireless telephone service in the form of a telecommunications channel originating from a PSTN 20 rather than a cellular network 14. Since the PSTN 20 is used, the subscriber device 12 receives high quality voice or data services at a relatively low cost. The telecommunications channel may also be provided over the Internet connection 30 between the base station 18 and the indoor system server 24. If the user of the subscriber device 12 roams outside of the unlicensed wireless service coverage area 16, the same communication session can be maintained without interruption by transitioning to the licensed wireless service provided by the cellular network 14. Techniques for implementing seamless transitions of this type are discussed in detail below.

A system server 24 facilitates seamless transitions between the licensed wireless service and the unlicensed wireless service. The system server 24 is in electronic communication with the standard cellular network 14. In one embodiment of the invention as shown in FIG. 1, the system server 24 is also in electronic communication with the base station 18 through a Local Area Network (LAN) 28 and a larger network 30, such as the Internet.

FIG. 1 illustrates that the cellular network 14 includes standard components, such as a cellular core network 15, a mobile switching center 26, visitor location register 32, a home location register 34, an authentication center 38, and a base station controller 38. As discussed below, these standard components are utilized in a novel manner in order to provide extended functionality for a subscriber device 12.

Figure 2:
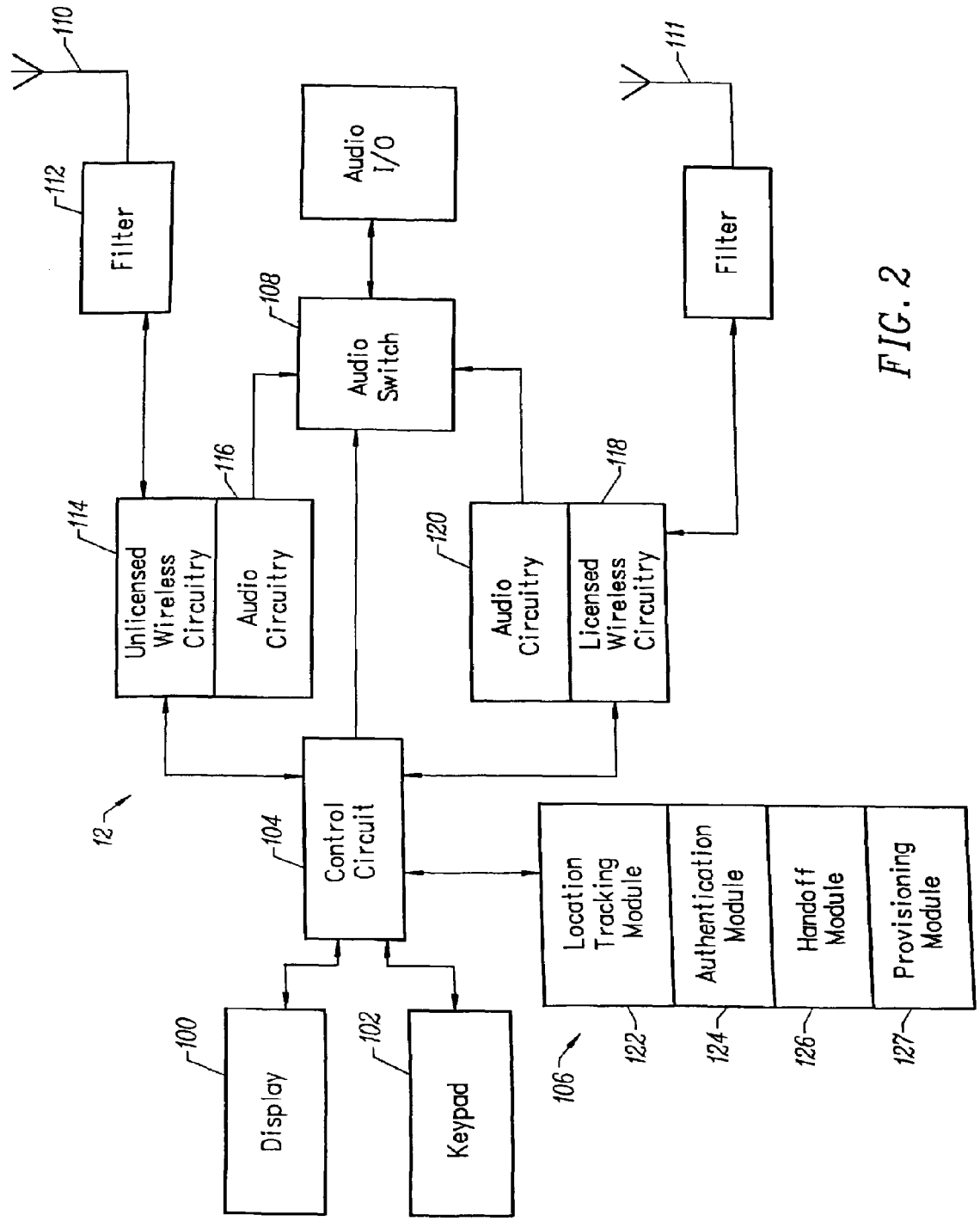
FIG. 2 illustrates a subscriber device configured in accordance with an embodiment of the invention.

FIG. 2 illustrates a subscriber device 12. As previously indicated, the subscriber device 12 may be a wireless telephone or a wireless modem. In the case of a wireless telephone, the subscriber device 12 includes a display 100, keypad 102, and processor 104. The processor 104 is also connected to a memory module 106 and, via audio switch 108, to an audio input/output circuit 109. Wireless signals in the unlicensed spectrum are received by an antenna 110 and are filtered by a filter 112 to improve signal clarity and/or strength. The wireless signals are then processed by unlicensed wireless circuitry 114. The unlicensed wireless circuitry 114 operates as a standard transceiver. The circuitry 114 may support any number of unlicensed wireless standards. For example, currently in the U.S., unlicensed wireless signals may be sent at 900 MHz or in the frequency range between 2.4 GHz and 5 GHz. Unlicensed wireless communication may be implemented in accordance with the invention utilizing any number of unlicensed spectrum communication protocols, including Bluetooth, IEEE 802.11a, IEEE 802.11b, and Hyper-LAN. Advantageously, many licensed wireless subscriber devices are currently being configured to include unlicensed wireless circuitry for such applications as remote microphones and speakers. In accordance with the invention, this circuitry is used for a new application, namely, communicating with a base station, as discussed below.

Selected signals, such as location data or signal strength data, are sent to the processor 104. Audio data is converted to an audio signal by audio circuitry 116 and is sent to an audio switch 108 for broadcast by an audio input/output circuit 109. Audio signals transmitted to the audio input/output circuit 109 are transmitted by audio switch 108 to the processor 104, which is capable of sending audio and other data to unlicensed cellular transmitter circuitry 114. Unlicensed spectrum signals are then sent through the filter 112 and on to the antenna 110, where they are broadcast to the base station 18.

In similar manner, wireless signals from a licensed cellular network 14 are transmitted to the antenna 111, filtered by the filter 113, and are then processed by the licensed cellular transmitter/receiver circuitry 118. These signals are subsequently converted to an audio signal by audio circuitry 120 or are processed by processor 104. As above, signals originating from the device 12 can also be sent out, but here the destination is a cellular network 14 rather than a base station 18. In the event of a data modem, the audio input/output circuit 109 is omitted and a data source is applied directly to the processor 104. Audio signals transmitted from the audio input 109 are transmitted by audio switch 108 to the processor 104, which is capable of sending audio and other data to licensed wireless transmitter and receiver circuitry 118. Wireless signals are then sent through the filter 113 to the antenna 111, where they are broadcast to the licensed wireless network 14.

The subscriber device components discussed up to this point are standard. The utilization of these devices is exploited in a novel manner through a set of executable programs stored in memory 106. The executable programs within memory 106 are shown by way of example. The same functionality may be realized through hardwired circuits, application specific integrated circuits, programmable logic devices, and the like.

The executable programs reside on top of standard licensed wireless system call processing software. In addition, the programs reside on top of standard unlicensed wireless link protocol software (e.g., standard Bluetooth or 802.11b software). The programs bridge these systems by exchanging messages between the separate software stacks. Advantageously, this approach allows a large portion of the existing software protocols in the subscriber device to be reused without any changes.

The memory module 106 contains a location tracking module 122 that records the current location of the device 12 (i.e., whether the device is within an unlicensed coverage area 16). In addition, the module 106 contains an authentication module to coordinate an authentication procedure for validating that the device 12 is licensed for use within the unlicensed coverage area 16. As discussed below, the invention utilizes the authentication infrastructure associated with the licensed wireless system to authorize a subscriber device for unlicensed wireless system services. The memory 106 also includes a handover module 126 to coordinate seamless service exchanges between a base station 18 and a cellular network 14. The operations associated with each of the modules stored in memory 106 are discussed in further detail below.

Figure 3:
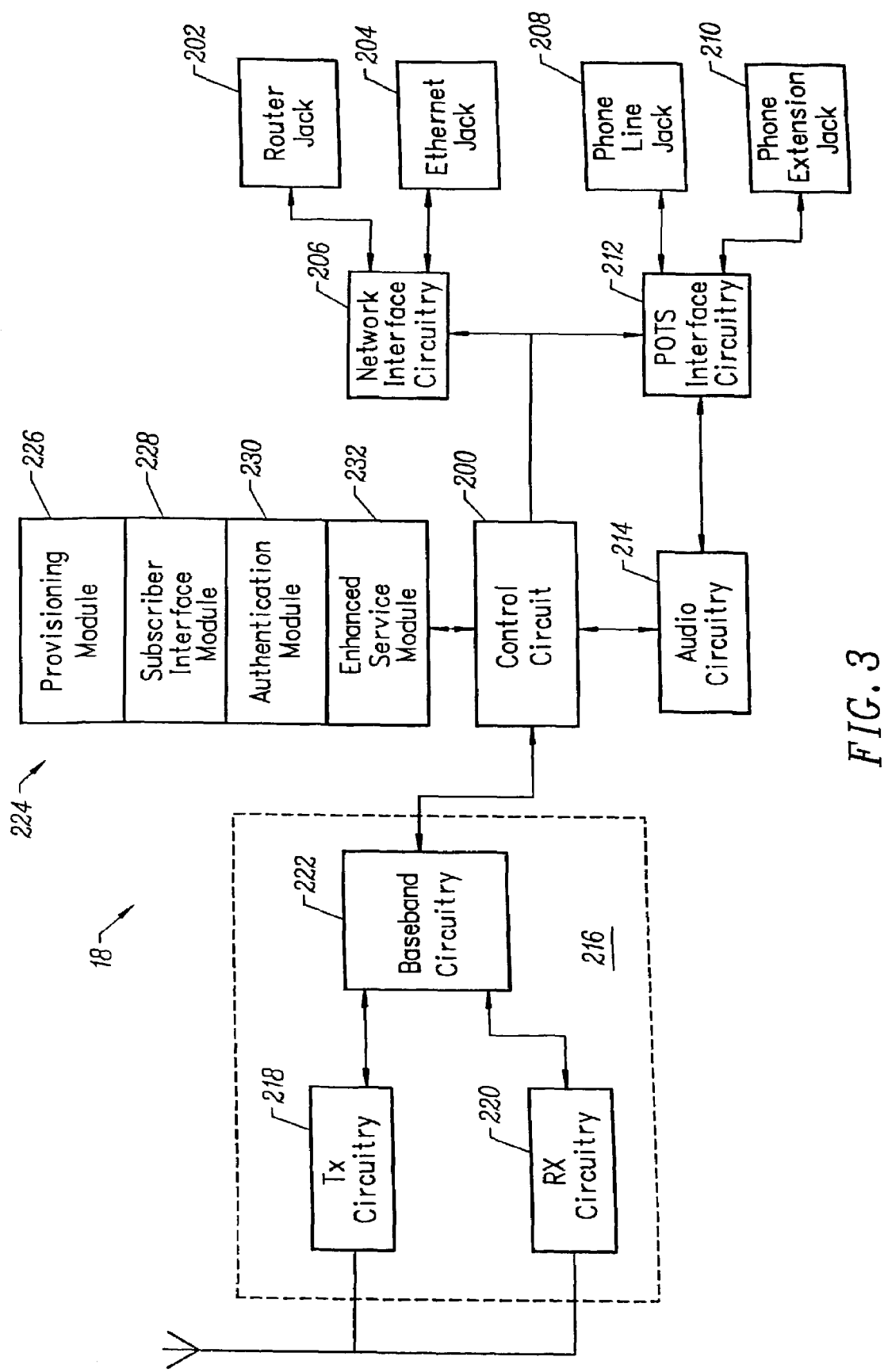
FIG. 3 illustrates a base station configured in accordance with an embodiment of the invention.

FIG. 3 illustrates an embodiment of a base station 18 in accordance with an embodiment of the present invention. When the subscriber device 12 is within the coverage area 16 of the base station 18, the base station 18 can be used to provide the subscriber device 12 with landline data and voice service, instead of lower-quality licensed wireless service, such as from the cellular network 114. In one embodiment of the invention, the base station 18 is controlled by a processor 200, which is in communication with the LAN 28 and therefore the system server 24 via router jack 202 and/or Ethernet jack 204. Signals from the system server 24 travel through one of these jacks into network interface circuitry 206 and on to the processor 200. This allows the base station 18 to communicate with the system server 24, which allows the server 24 to determine whether and when to route phone service over the PSTN 20, Internet 30, or cellular network 14. Likewise, the processor 200 is also in communication with a landline (PSTN 20 and, in the typical business context, PBX 22) via a phone line jack 208 and/or phone extension jack 210. These jacks transmit information between the PSTN 20 and processor 200 through Plain Old Telephone Service (POTS) interface circuitry 212. Audio data is translated by audio circuitry 214, while other data can be directly exchanged with the processor 200.

The base station 18 communicates wirelessly with devices 12 using a wireless communication circuit block 216. This circuit block 216 includes standard circuitry to receive and transmit electronic voice and/or data in an unlicensed wireless signal format. For example, currently in the U.S., unlicensed wireless signals may be sent in the frequency range between 2.4 GHz and 5 GHz. Unlicensed wireless communication may be implemented in accordance with the invention utilizing any number of unlicensed spectrum communication protocols, including Bluetooth, IEEE 802.11a, IEEE 802.11b, and Hyper-LAN.

A typical circuit block 216 consists of transmission circuitry 218 for transmitting signals to a device 12, receiving circuitry 220 for receiving signals from the device 12, and baseband circuitry 222. The baseband circuitry 222 contains standard circuitry for downconverting unlicensed wireless signals to baseband signals, which allows for the extraction of relevant information by the processor 200. The baseband circuitry 222 also contains standard circuitry for upconverting baseband data from the processor 200 to unlicensed wireless signals for broadcast by transmission circuitry 218.

The processor 200 is also connected to a memory module 224. The memory module 224 contains a provisioning module 226 that is used to facilitate the initial configuration and servicing of the base station 18 and subscriber device 12. The module 224 also includes a subscriber device identification module 228. The subscriber device identification module 228 instructs the processor 200 to periodically broadcast a signal. If a subscriber device 12 responds to the signal, then the base station 18 knows that the subscriber device 12 is within the unlicensed coverage area 16. The module 224 also contains an authentication module 230 to coordinate the authentication of a subscriber device 12 that has entered the unlicensed coverage area 16. In one embodiment of the invention, the memory 224 includes an enhanced service module 232. The enhanced service module may be used to provide improved services to a subscriber device. For example, if the user of a subscriber device is playing a low latency on-line game, different screen displays can be cached in the base station 18 and then be quickly downloaded to the subscriber device 12. Each of the modules stored in memory 224 can also be implemented as hardwired circuits, application specific integrated circuits, programmable logic devices, and the like.

Figure 4A:
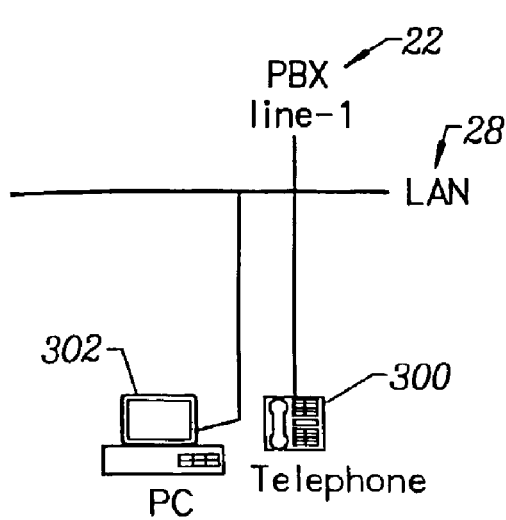
FIGS. 4A-4D illustrate various base station configurations utilized in accordance with embodiments of the invention.

In order to provide landline-quality service to subscriber devices 12, a base station 18 is installed directly in the path of a typical phone system. FIG. 4A illustrates a typical office or workplace, where a telephone 300 is connected to a PBX 22. The PBX 22 is installed between the telephone 300 and PSTN 20 to provide a private telephone network in which a number of telephones 300 share a certain number of outside lines from the PSTN 20. FIG. 4A illustrates that a Personal Computer (PC) 302 can be connected to the LAN 28 for communication with the Internet 30.

Figure 4B:
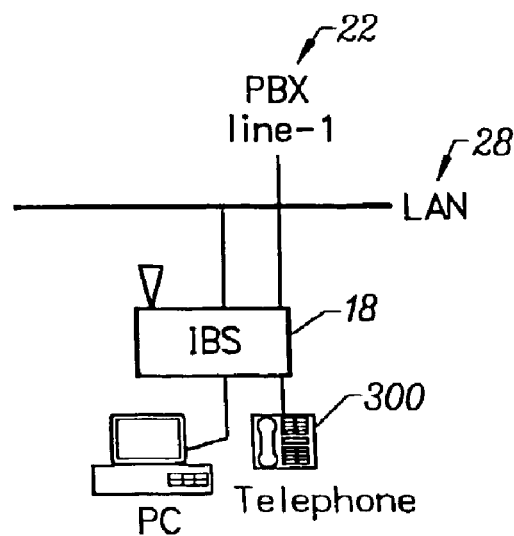

FIG. 4B illustrates the workplace environment of FIG. 4A modified to incorporate the base station 18 of the invention. The base station 18 is placed in electronic communication with both the telephone 300 and the LAN 28. This configuration allows base station 18 to receive landline voice and data from a PSTN 20 and broadcast it to subscriber devices 12 when they are within the coverage area 16. The base station 18 is also connected to a LAN 28, which allows it to communicate with the system server 24 in order to coordinate handovers between the licensed wireless and unlicensed wireless systems. Advantageously, the base station 18 operates transparently with respect to the PBX 22, the LAN 28, the telephone 300, and the PC 302.

Figure 4C:
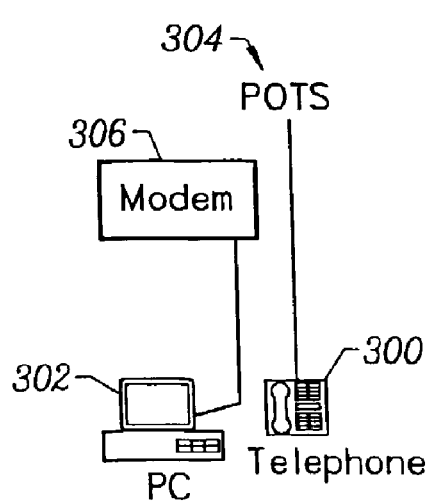
Figure 4D:
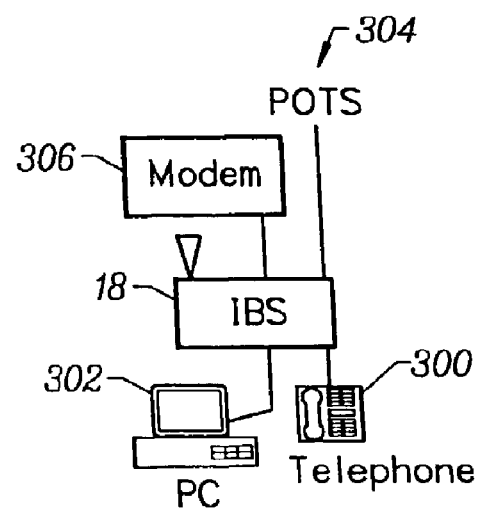

FIG. 4C illustrates a typical home setting, which is usually similar to the workplace setting of FIG. 4A minus the LAN 28 and PBX 22. The telephone 300 is ordinarily connected directly with a POTS 304, which is simply another term for PSTN 20. Connection to the Internet 30 is provided by a modem 306 in communication with a PC 302. FIG. 4D illustrates the placement of base station 18 within this typical home setting. Here, the base station 18 is placed in electronic communication with both a telephone 300 and modem 306, allowing it to communicate directly with the POTS 304/ PSTN 20 and system server 24. Once again, the base station 18 operates transparently with respect to the modem 306, the POTS 304, the telephone 300, and the PC 302.

In both the workplace and home settings, the base station 18 is in simultaneous communication with both a telephone landline and a system server 24. When a subscriber device 12 roams inside the coverage area 16, the base station 18 can thus provide landline-quality service to device 12. The invention should thus be construed to include an apparatus and method for the seamless switching of telephone service between a cellular network 14 and a landline-based base station 18 that can be used in either a residential or commercial setting.

As mentioned above, for purposes of this invention a landline can be interchangeably referred to as a POTS 304 or PSTN 20. However, the invention should not be construed as limited to simply the POTS or PSTN context. Rather, the invention discloses a base station 18 that can provide landline-quality service to a device 12 using any landline network. Examples of such networks include, but are not limited to, DSL, cable or cable modem networks.

Figure 5:
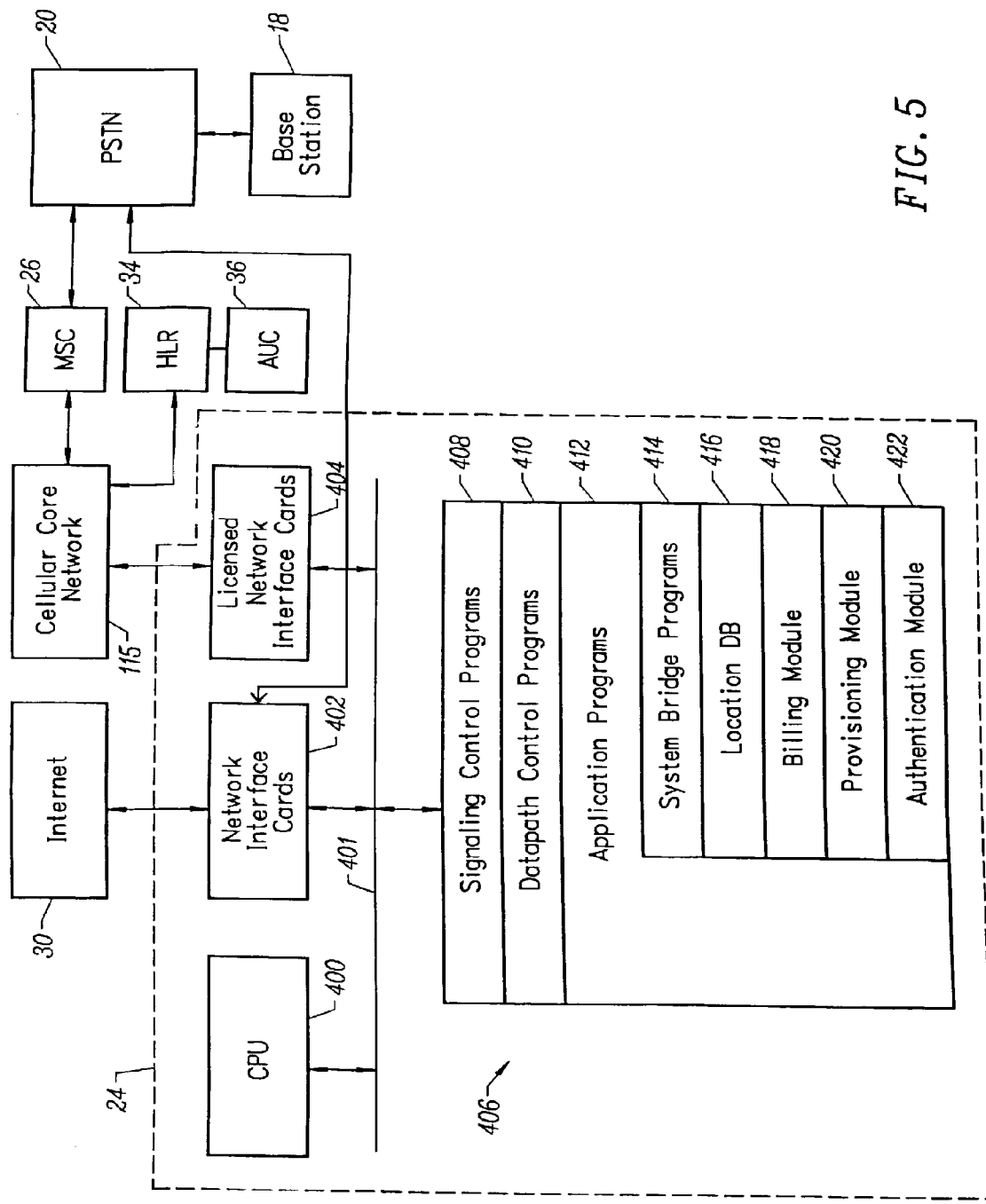
FIG. 5 illustrates a system server for integrating unlicensed and licensed wireless communication systems in accordance with an embodiment of the invention.

FIG. 5 illustrates a system server 24, which manages the mobility of subscriber devices 12 between a landline-based unlicensed wireless service from a base station 18 and a licensed wireless service, such as from a cellular network 14. A typical system server 24 is controlled by a central processing unit (CPU) 400, which is connected to a bus 401. Network interface cards 402 (e.g., Ethernet cards) for communicating with the Internet 30 and PSTN 20 are also connected to the bus 401. Licensed network interface cards 404 (e.g., SS7 cards) for communicating with cellular networks 14 are also connected to the bus 401. This allows the system server 24 to use Internet Protocol (IP) and/or SS7 protocol and/or MAP & IS-41 protocols to connect to the Internet, to the PSTN 20, and to cellular core networks.

The system server 24 also contains a memory module 406 that stores a number of programs, databases and other assorted modules. More specifically, the module 406 contains signaling control programs 408. The signaling control programs 408 are standard programs for establishing communications with the licensed wireless network. Therefore, for example, the signaling control programs 408 may include a Transaction Capability Application Part (TCAP) module, an ISDN User Part (ISUP) module, a Signaling Connection Control Part (SCCP) module, a Message Transfer Part (MTP) module, a GSM Mobile Application Part (MAP) module, a GSM Base Station Subsystem Application Part (BSSAP), a Code Division Multiple Access (CDMA) Development Group Interoperability Specification (CDG-IOS) module, and an Interim Standard (IS41) module to support Time Division Multiple Access (TDMA) and Code Division Multiple Access (CDMA). Memory 46 may also store datapath control programs 410. By way of example, the datapath control programs may include standard programs to facilitate computer network data transfers. By way of example, the datapath control programs may include an Internet Protocol (TP) module, a GSM Base Station Subsystem General Packet Radio Service (GPRS) Part (BSSGP), and a GPRS Tunneling Protocol (GTP) module.

The memory 406 also stores various system server application programs 412. These application programs include system bridge programs 414 for handling transitions in service from licensed to unlicensed wireless services and vice versa. The memory 406 also stores a location database 416 for storing the current location of devices 12 and indicating whether they are within the coverage area 16. Also included is a billing module 418 for recording usage statistics for billing purposes. The billing module 418 distinguishes between charges for licensed wireless services and unlicensed wireless services. A provisioning module 420 is included to facilitate the installation of new base stations. An authentication module 422 is used to facilitate the authentication of a subscriber device within an unlicensed wireless service area. As discussed below, the authentication module 422 includes data and executable instructions to emulate certain components of a licensed wireless network. For example, in one embodiment of the invention, the authentication module emulates a mobile switching center during the authentication process.

The major components of the invention—the subscriber device 12, the base station 18, and the system server 24—have now been described. The operations of these devices are more fully appreciated with the following discussion.

Figure 6:
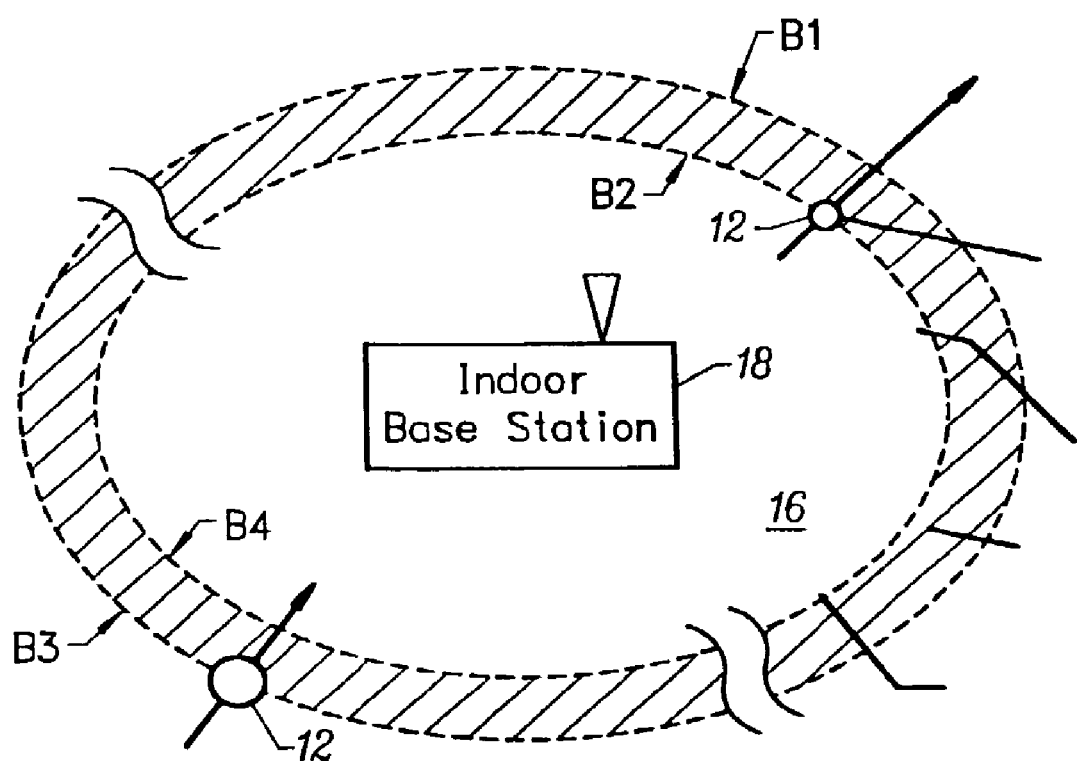
FIG. 6 illustrates a base station service region and associated transition points between licensed and unlicensed wireless communication services.

The invention's provisioning of seamless transitions between licensed and unlicensed wireless services is more fully appreciated in connection with FIG. 6. Base station 18 broadcasts within a set of boundaries B1, B2, B3 and B4. A subscriber device 12 located outside these boundaries is serviced by a licensed wireless system, such as a standard cellular network 14. However, once the device 12 crosses boundary B3, the handover from the licensed wireless service to the unlicensed wireless service begins. That is, at the B3 boundary the base station 18 is able to recognize the presence of the subscriber device 12. As previously indicated, the base station 18 includes a subscriber device identification module 228 that coordinates the transmission of a service range signal that is identified by a subscriber device 12. That is, the location tracking module 122 of the subscriber device 12 is used to coordinate the identification of a base station signal. In the presence of such a signal, the location tracking module 122 coordinates the transmittal of an acknowledgment signal to the base station 18.

In one embodiment, the location tracking module 122 is implemented to periodically wake the unlicensed wireless circuitry 114 to sniff and thereby determine whether it is within the range of a base station. If so, the subscriber device registers with the base station, if not, the unlicensed wireless circuitry 114 is activated at a later time.

Under the control of the subscriber device identification module 228, the base station 18 identifies the acknowledgement signal and transmits a subscriber device present signal to the router jack 202, the Ethernet jack 204, the phone line jack 208, or the phone extension jack 210. The subscriber device present signal is subsequently directed through a network (e.g., the LAN 28 and Internet 30) to the system server 24, which notes that the subscriber device 12 is now within the service area of the base station 18. In particular, the system server 24 logs this information in the location database 416.

Once the system server 24 logs the fact that the subscriber device 12 is within the service range of the base station 18, it contacts the cellular network 14 to initiate a call to the landline associated with the base station 18. It is known in the art to utilize a cellular network 14 to establish a call to a landline number. For example, FIG. 1 illustrates a link between the mobile switch center 26 and the PSTN 22. In the prior art, this feature is used to direct a call intended for a mobile device to a landline telephone when the user of the mobile device has advised the cellular system that the landline telephone can be used to receive calls. Observe in this situation that the transition from the cellular network to the landline telephone is established prior to the call being placed. This prior art scenario stands in sharp contrast to the present invention where during the course of an already established communication session control is transferred from a licensed wireless service to an unlicensed wireless service or vice versa. This aspect of the invention is more fully appreciated in connection with the following discussion.

As previously indicated, when the subscriber device 12 crosses the boundary B3, a landline call to the base station 18 is initiated by opening a telecommunications channel through a standard landline system such as the PSTN 20. Once the landline call is received at the base station 18, the base station 18 begins transmitting to the subscriber device 12 using the unlicensed wireless spectrum. These transmissions are processed by the unlicensed wireless circuitry 114 of the subscriber device 12 (See FIG. 2). At this point, the licensed wireless circuitry 118 is also active and the audio switch 108 is responsive to the licensed wireless circuitry 118. Thus, the subscriber device 12 is processing both licensed wireless signals and unlicensed wireless signals at this point.

The location tracking module 122 continues to monitor the signal strength from the base station 18. When the signal strength reaches a threshold corresponding to the crossing of boundary B4, the handover module 126 may be used to generate a handover signal that is applied to the audio switch 108. The handover signal causes the audio switch 108 to process information from the audio circuitry 116 associated with the unlicensed wireless circuitry 114. At this point, the licensed wireless circuitry 118 can be turned off. The ability to turn this circuitry off is a significant advantage because it preserves battery life. Typically, the licensed wireless circuitry remains active in order to provide location information to the licensed wireless system infrastructure.

The spacing between boundaries B3 and B4 allows time for the establishment of simultaneous telecommunications channels between the subscriber device 12 and both the licensed network and unlicensed network. This allows for the immediate switching of service to the unlicensed network once the subscriber device 12 crosses boundary B4, thus creating a seamless transition to base station service that is transparent to the user.

Once the device 12 is within boundary B4, service is originated within the PSTN 20 and broadcast wirelessly to the device 12 by the base station 18. If the device 12 travels away from this base station 18, service is handed off from the base station 18 to a licensed wireless network 14 in a manner similar to the process described above. Specifically, once the device 12 crosses boundary B2, a simultaneous link is established with a licensed wireless network (e.g., cellular network 14). When the device 12 further crosses boundary B1, a seamless handover is made from the unlicensed wireless service originating over the PSTN 20 to the licensed wireless network (e.g., cellular network 14). At this point, the subscriber device 12 receives wireless services from the cellular network 14 in a standard manner.

Figure 7:
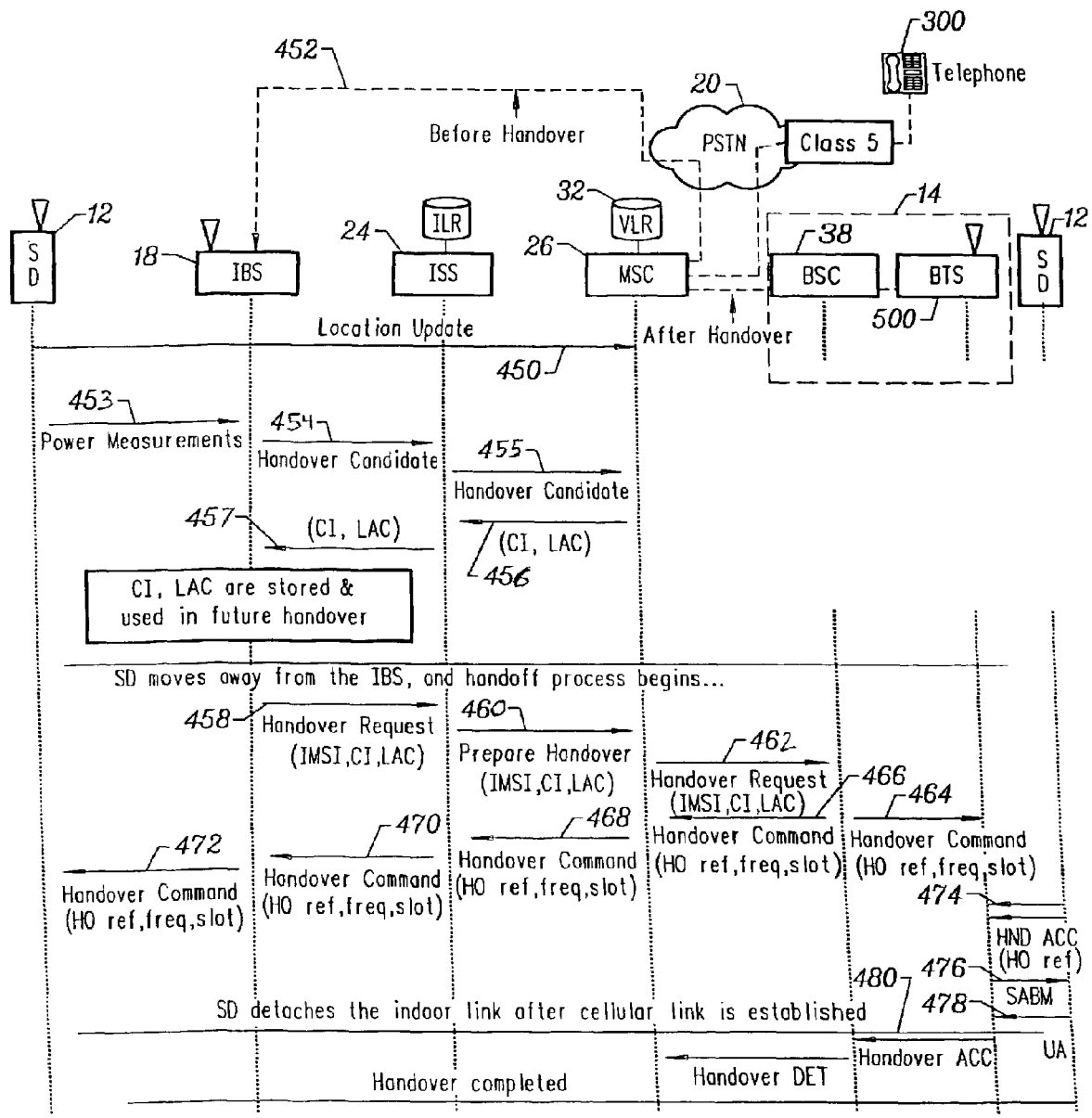
FIG. 7 illustrates a transition between an unlicensed wireless service and a licensed wireless service in accordance with an embodiment of the invention.

FIG. 7 provides a more detailed characterization of the handover process from unlicensed wireless to licensed wireless service. When the subscriber device 12 is within the service area 16 of the base station 18, the subscriber device 12 transmits to the base station 18 information on the signal strengths of the frequencies of the nearby licensed wireless base stations. The base station 18 forwards this information to the system server 24, which in turn sends the information to the visitor location register 32. This operation is shown with arrow 450 in FIG. 7.

In response to this message, the licensed wireless system provides the parameters that are needed when the subscriber device 12 needs a handover from the unlicensed wireless system to the licensed wireless system. This information includes the identity of the base station to which the handover should be made. By way of example, in a GSM cellular system, these parameters are CI (Cell Identity) and LAC (Location Area Code). This handover information may be obtained and stored in the base station 18 before a call is made or when a call is made. In any event, the handover information can be secured well before the subscriber device 12 roams outside the coverage area of the base station 18. The information may be delivered to the base station 18 via a landline telecommunications channel as shown with line 452. Alternately, the information may be delivered through a telecommunications channel between the system server 24 and the mobile switch center 26 and then the system server 24 and the base station 18, as shown with arrows 456 and 457.

As shown with arrow 453 in FIG. 7, the subscriber device 12 continuously transmits power measurements to the base station 18. When the power measurements begin to grow weak, the base station may notify the system server 24 of a hand over candidate. In turn, the system server 24 may advise the mobile switching center 26 of the hand over candidate, as shown with arrows 454 and 455.

When the power measurements become sufficiently weak, indicating that the subscriber device 12 is moving away from the base station 18 (e.g., crossing boundary B2) a formal hand over request is initiated. In particular, the base station 18 transmits to the system server 24 the base station identity (e.g., CI, LAC, etc.) to which the handover should be transferred, as shown with arrow 458. The system server 24 contacts the mobile switching center 26 to initiate a handover, as shown with arrow 460. The mobile switching center 26 contacts the base station controller 38, as shown with arrow 462. In response, the base station controller 38 generates a channel number, a slot number and a handover reference. As shown with arrow 464, this information is passed to the base station transceiver 500. The information is also passed back to the subscriber device 12 through the mobile switching center 26, the system server 24, and the base station 18, as shown with arrows 466, 468, 470, and 472.

In response to this information, the base station transceiver 500 turns on a transmitter and receiver at the specified channel number and slot number. Similarly, the subscriber device 12 turns on its transceiver circuitry 118. The base station transceiver 500 seeks a response from the subscriber device with a matching reference number, as shown with arrow 474. Once the subscriber device 12 receives the base station transceiver transmission, it sends a message to the base station transceiver 500 with the handover reference, as shown with arrow 476. At this point a new licensed wireless link, or telecommunications channel, is established on the given channel and slot number, as shown with arrow 478. Once the licensed wireless link is established, the unlicensed wireless link is turned off, as shown with line 480 in FIG. 7. Thereafter, the base station transceiver 500, the base station controller 38, and the mobile switching center 26 operate in a standard manner to supply licensed wireless services to the subscriber device 12. The foregoing operations may be implemented using the handover module 126 of the subscriber device 12, the subscriber device interface module 228 of the base station 18, and the system bridge programs 414 of the system server 24.

A handover from a licensed wireless service to an unlicensed wireless service occurs in a similar but reverse fashion. When the subscriber devices 12 cross boundary B3 from a remote location, the handover process to the base station 18 is initiated. The subscriber device 12 detects boundary B3 as a requisite strength of signal transmitted from the base station 18. It then transmits a signal to the base station 18 indicating its presence, and the station 18 sends a handover request to the system server 24, which conveys the request to the mobile switching center 26. The mobile switching center 26 then secures the applicable landline number from the home location register 34.

The correct landline number is already stored in the home location register 34 according to a process discussed below. The home location register 34 transmits this number back to the mobile switching center 26, which activates the corresponding landline over the PSTN 20. Between boundaries B3 and B4, both the licensed wireless (e.g., cellular) link and unlicensed wireless (e.g., landline originated) link are simultaneously active. After a period in which both links are simultaneously active, control of the communication session is switched from the licensed wireless circuitry 118 to the unlicensed wireless circuitry 114. As above, the maintenance of simultaneous licensed and unlicensed wireless links for a period of time ensures a successful seamless handover. This reduces the number of dropped calls, and allows for successful handovers even when the signaling messages among different elements of the cellular and landline-based systems experience delays or latency.

The previous discussion explains the handover process in broad terms. A further embodiment of the invention, describing a concept of the handover process in more detail, is offered below in connection with FIG. 14. In addition, while the foregoing discussion was directed toward handovers between licensed wireless services and unlicensed wireless services. The invention also includes a technique for seamless handovers between unlicensed wireless service base stations. Such a technique would be valuable, for example, in the case where an office building has a large number of base stations 18 to supply unlicensed wireless services to a user that would otherwise receive poor quality licensed wireless service within the office building.

Thus, the invention includes a system wherein a plurality of base stations 18 exist with overlapping coverage areas 16. This allows a subscriber device 12 to roam freely among the coverage areas 16.

Figure 8:
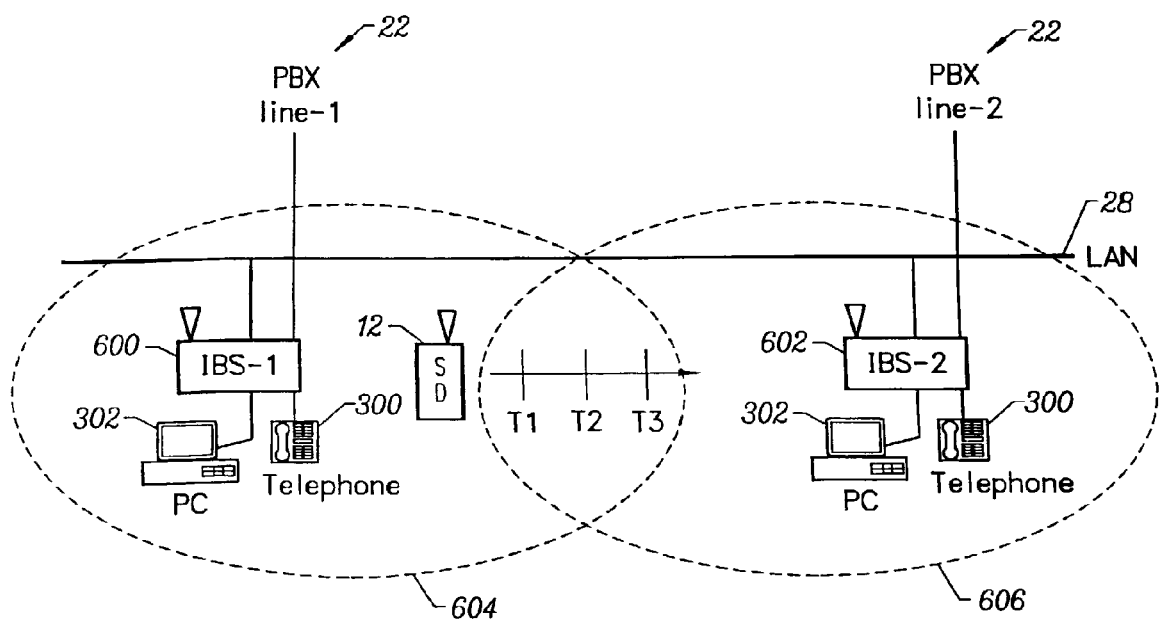
FIG. 8 illustrates transitions between unlicensed wireless base stations in accordance with an embodiment of the invention.

FIG. 8 illustrates such a system. Base stations 18-1 and 18-2 communicate with each other using LAN 28. The base stations 18-1 and 18-2 are shown installed in a typical workplace setting, with telephones 300 and PCs 302 connected to a LAN 28 and PBX 22 in standard fashion. Note that the coverage areas 604 and 606 of the base stations 18-1 and 18-2 overlap. As a device 12 moves from one area 604 to another area 606, voice and data signals from the first base station 18-1 are seamlessly handed off to the second base station 18-2.

Periodically, the base stations 18-1 and 18-2 broadcast a message over the LAN 28 to all other base stations connected to the LAN 28. This message includes a time stamp, a signal indicating the particular base station, the subscriber number, and a range number indicating the distance between that base station and the device 12. A separate message is broadcast for each base station on the LAN 28. A range number can be calculated by relying upon the ability of the subscriber device 12 to measure the signal strengths emitted from a base station or vice versa.

Signal strengths and/or range numbers can be used to determine when a handover should be initiated. For instance, at positions T1 and T2, the device 12 would remain serviced by the first base station 18-1. However, when the device 12 moves to position T3, the message it broadcasts, which includes the components above, indicates that the base station 18-2 now transmits a stronger signal and is thus closer. The second base station 18-2 receives this message via LAN 28 and, from the range number, determines that it is the closest base station to the device 12. The handover process from base station 18-1 to base station 18-2 is then initiated. The second base station 18-2 transmits a signal over LAN 28 to the first base station 18-1 requesting a handover and sending information, such as the range numbers calculated from the device 12 to each base station 18-1 and 18-2, verifying that a handover should indeed be made.

Once the first base station 18-1 acknowledges this request, it forwards the call to the second base station 18-2 and service is continued without disruption. In a system that includes a PBX 22, it is often possible for the first base station 18-1 to simply request PBX 22 to switch service to a different base station. However, in a system without a PBX 22, the first base station 18-1 may have to switch service at PSTN 20.

The discussion up to this point has been directed toward seamless transitions between licensed and unlicensed wireless services. Attention now turns to other aspects of the invention. Another aspect of the invention is a technique for assigning a base station to a landline telephone number. Another aspect of the invention is a technique for authenticating a user for unlicensed wireless services. Advantageously, authentication is implemented through reliance upon existing authentication infrastructure associated with the licensed wireless network. Thus, a separate authentication scheme need not be implemented. Another aspect of the invention that is discussed below is the provisioning of a base station into the overall licensed wireless network. As discussed below, the provisioning operation is automatically performed and therefore does not require technical sophistication or expertise on behalf of the user.

Figure 9:
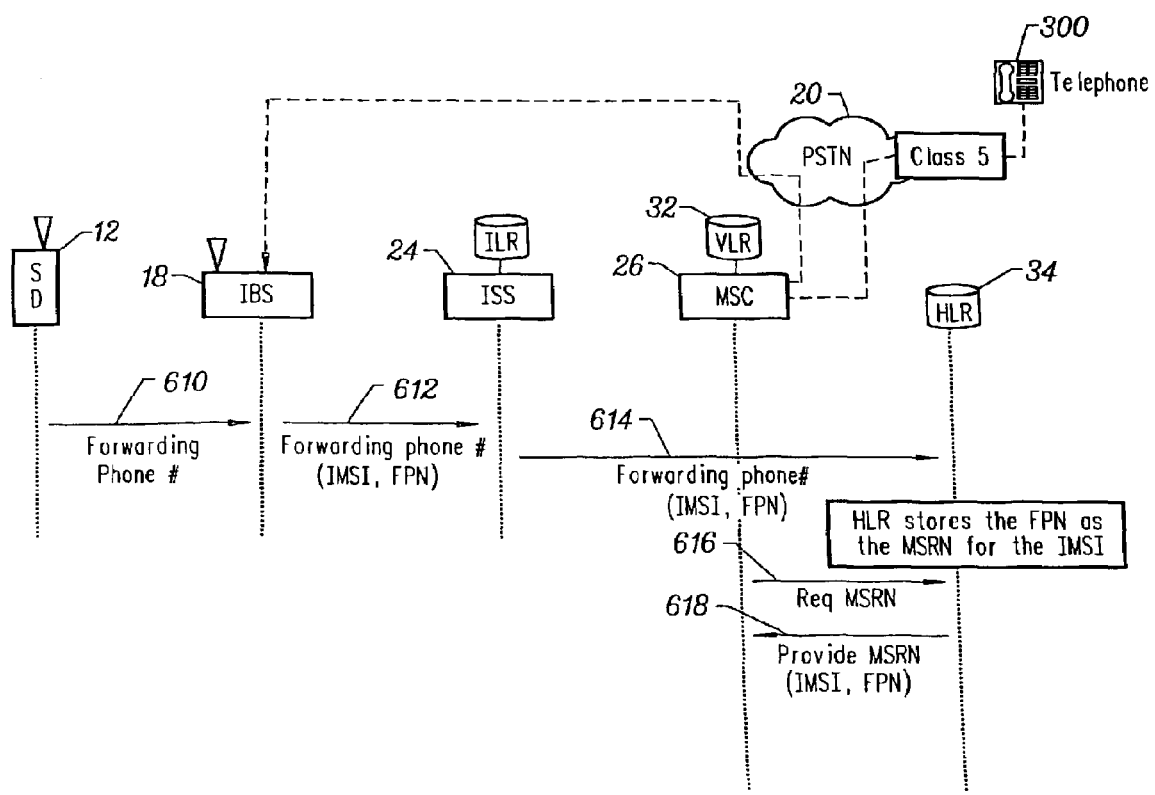
FIG. 9 illustrates the forwarding of a licensed wireless call to a base station in accordance with an embodiment of the invention.

FIG. 9 illustrates a technique for assigning a landline number to a base station 18. Upon installation and power-up, the base station 18 queries the subscriber device 12 for the local landline phone number to which the base station is connected.

In some embodiments, the base station 12 will also solicit the Internet Protocol (IP) address for the base station 18. After the user enters the phone number and/or IP address into the subscriber device 12, the information is transmitted to the base station 18, as shown with arrow 610 of FIG. 9. The base station 18 forwards the same information to the system server 24, as shown with arrow 612. The system server 24 then transmits this information for storage in the home location register 34, as shown with arrow 614. Once stored in the home location register 34, the mobile switching center 26 can access the number as a mobile system roaming number (MSRN), as shown with arrows 616 and 618. Thereafter, the mobile system roaming number can be used in a conventional manner to route a call to the base station 18.

Another aspect of the invention is authentication. As previously indicated, the invention utilizes the authentication infrastructure associated with the licensed wireless network to authenticate users for the unlicensed wireless network.

Figure 10:
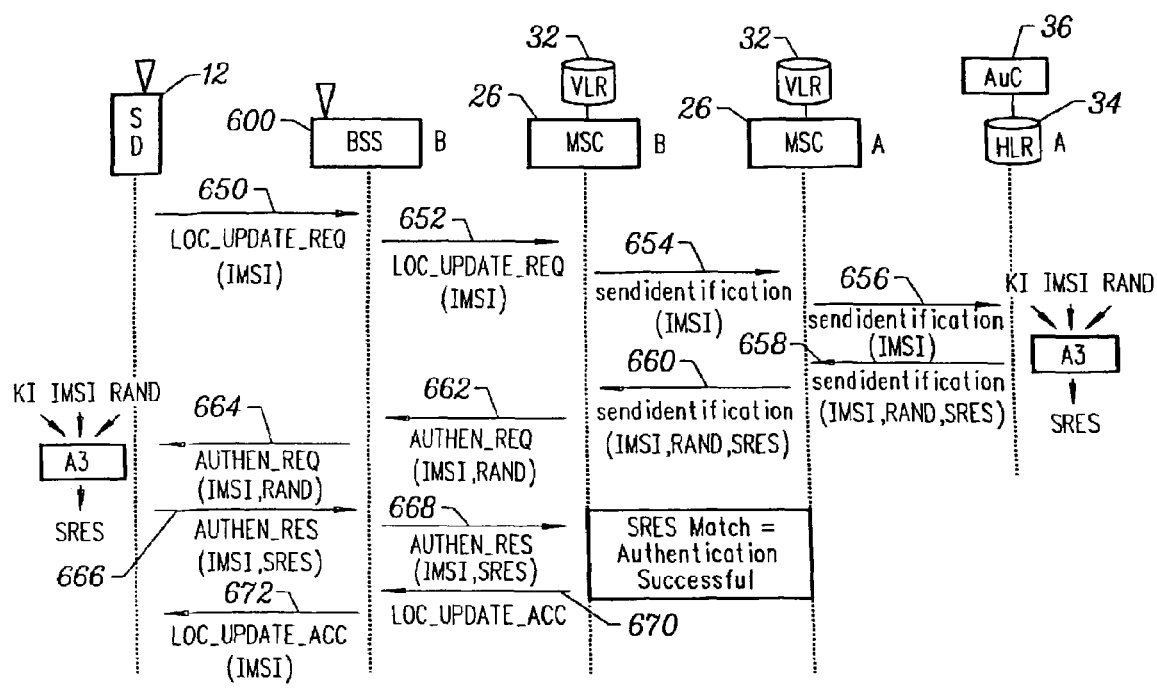
FIG. 10 illustrates a prior art licensed wireless authentication procedure.

FIG. 10 illustrates a licensed wireless system authentication process utilized in accordance with the prior art. In this example, the subscriber device 12 moves from the coverage area served by its home mobile switching center (referred to as MSC-A) to the coverage area served by MSC-B. As soon as the subscriber device 12 enters a cell that is served by MSC-B, it registers with the system by sending an authentication request and a location update to base station subsystem (BSS) 600, as shown with arrow 650. The location update request includes an international mobile subscriber identity (IMSI).

BSS 600 forwards this information to the visitor location register 32 associated with MSC-B, as shown with arrow 652. The visitor location register of MSC-B in turn sends a message to the visitor location register and home location register of the SMC-A, as shown with arrows 654 and 656. This information serves as a request for authentication of the subscriber device 12 as well as to inform the home location register 34 of the current location of the subscriber device 12 as served by the MSC-B. In certain alternate embodiments, location information can instead be provided in a separate message to the home location register 34. The authentication is performed as follows.

The authentication center (AuC) 36 generates a parameter called SRES (signed response). In order to generate the SRES, it uses an authentication algorithm A3, such as a public key/private key algorithm. The algorithm A3 processes a secret key Ki, a random number RAND, and the IMSI to produce the SRES. The IMSI, RAND, and SRES are passed to the MSC-A (arrow 658) and MSC-B (arrow 660). The SRES is temporarily stored at the MSC-B until the authentication operation is completed. The MSC-B passes the IMSI and the RAND to the BSS, which passes the information to the subscriber device 12. Based upon the IMSI and the RAND that it receives, along with the secret key Ki that it stores, the subscriber device 12 executes the same authentication algorithm A3 to produce a SRES. If the subscriber device is legitimate, it has the same secret key Ki encoded in it as the one in the AuC 36. The service provider encodes this key at the time of activating the subscriber. This key is known only to the subscriber device and to the AuC 36.

The SRES generated by the subscriber device 12 is passed with the IMSI to the BSS-B (arrow 666), which passes it to the MSC-B (arrow 668). The MSC-B compares the SRES generated by the subscriber device 12 to the SRES generated by the AuC 36. Authentication is only successful if the two numbers match.

Figure 11:
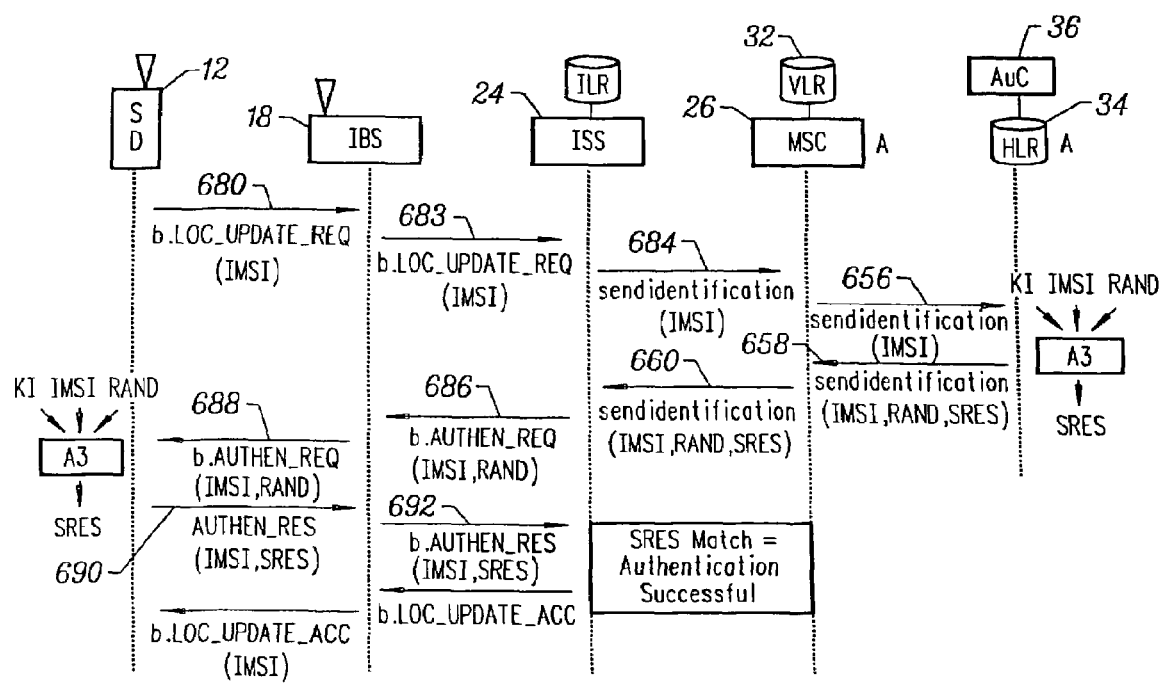
FIG. 11 illustrates an unlicensed wireless authentication procedure utilized in accordance with an embodiment of the invention.

The above process assists in understanding the authentication process included in the present invention, as the new method is designed to utilize the existing authentication process already existent in the licensed wireless system. FIG. 11 illustrates an authentication process in accordance with the present invention. In accordance with the invention, the base station 18 is designed to emulate a BSS 600, and the system server 24 is designed to emulate a mobile switching center 26.

When the subscriber device 12 enters the service area of the base station 18, it registers with the base station. The authentication module 124 of the subscriber device 12 subsequently intercepts the registration message that is typically sent to the licensed wireless base station (e.g., BSS 600). This information is sent to the base station 18, as shown with arrow 680. The base station 18, at the direction of the authentication module 230, routes the information to the system server 24. Thus, the base station 18 emulates the operation of a BSS. As shown with arrow 684, the system server 24 forwards the information to the MSC-A. The authentication module 422 of the system server 24 may be used for this purpose. In this capacity, the authentication module 44 assists the system server 24 in its operation of emulating a visitor location register. The operations at arrows 656, 658, and 660 are identical to the operations performed in the prior art system of FIG. 10.

At this point, the system server 24 stores the SRES, instead of a mobile switching center. The system server 24 forwards the IMSI and RAND information to the base station 18, as shown with arrow 686. The base station 18, emulating a BSS, passes this information to the subscriber device 12. The authentication operation performed at the subscriber device is conventional, with the subscriber device returning an IMSI and a SRES to the base station 18, as shown with arrow 690. The base station 18 passes this information to the system server 24, as shown with arrow 692. The system server 24 then checks for an SRES match. Recall that this operation was performed by the mobile switching center 26 in the prior art system of FIG. 10. In the event of a match between the computed SRES values, authentication exists and unlicensed wireless services may be delivered to the subscriber device 12 through the base station 18.

Yet another aspect of the invention involves provisioning of a base station in order to facilitate the licensed-to-unlicensed wireless communications achieved in accordance with the invention. By way of overview, the provisioning operation of the invention entails the base station 18 automatically configuring itself. In one embodiment, provisioning is accomplished by initially accessing a provisioning server. Subsequently, the base station registers with the system server. In the event that Internet access is available to the base station, the base station uses the Internet to access the provisioning server and the system server. If Internet access is not available, a Short Message Service Center may be used during the provisioning operation.

Figure 12:
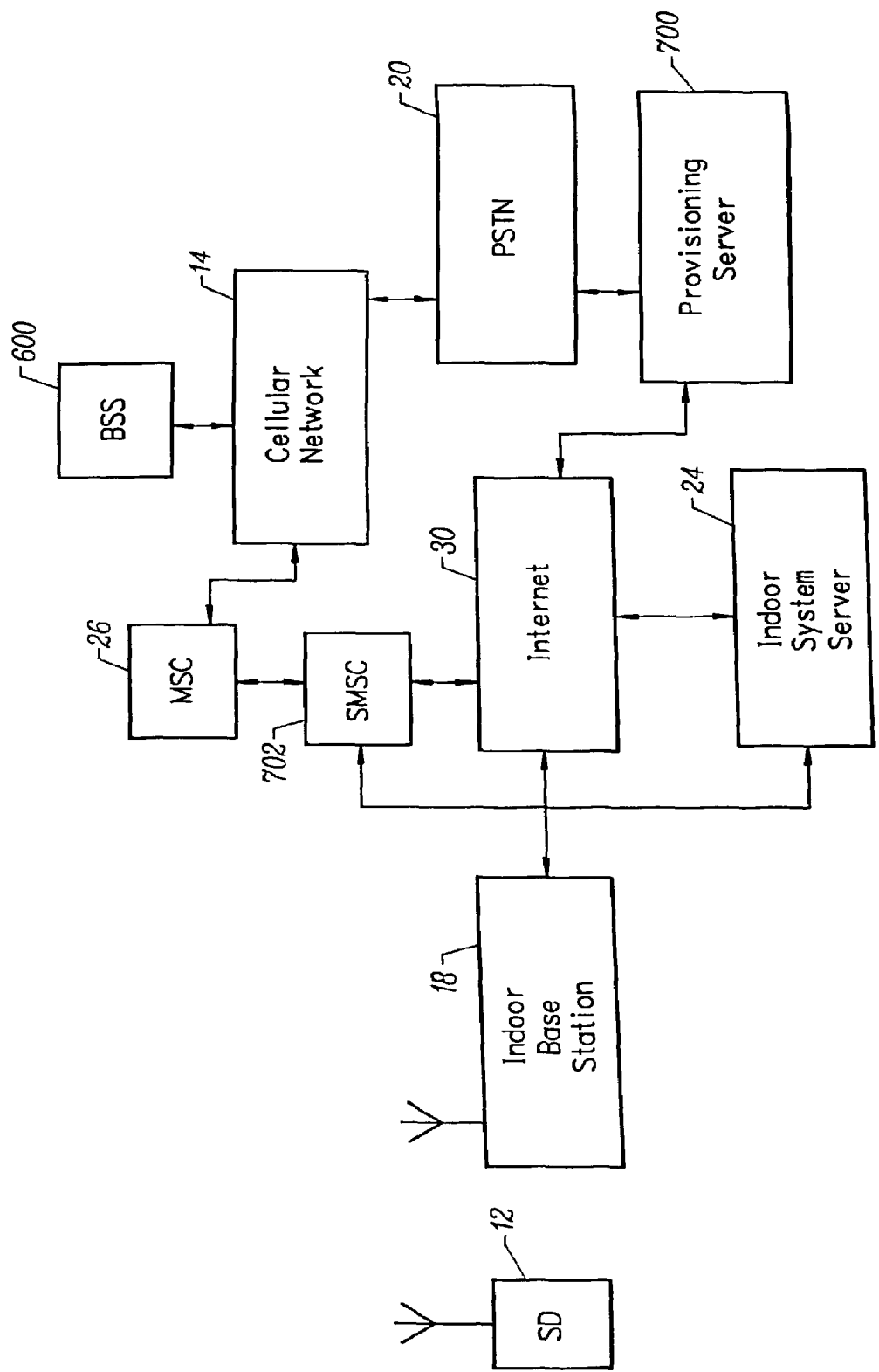
FIG. 12 illustrates system components utilized in a provisioning operation associated with an embodiment of the invention.

FIG. 12 illustrates equipment utilized during the provisioning operation. In particular, the figure illustrates a subscriber device 12 and a base station 18. In one embodiment, the base station 18 uses the Internet 30 to access a provisioning server 700. For example, the base station 18 may access the Internet through a broadband modem, such as DSL. The provisioning server 700 supplies a service profile to the system server 700, as discussed more fully below. In another embodiment of the invention, the base station 18 is provisioned through a wireless connection. In particular, a wireless link is established using a Short Messaging Service or packet data services supported by the cellular system. For example, a wireless link may be established between the base station 18 and a Short Message Service Center (SMSC) 702. The wireless link to the SMSC may be via a Short Message Service (SMS) over cellular air interface. The SMSC is linked to a BSS 600, which is linked to a mobile switching center 26, which is linked to the cellular core network 15. The cellular core network 15 accesses the provisioning server 700 via the PSTN 20. Information from the provisioning server is delivered to the system server 24 and the base station through a reverse path including, the PSTN 20, the cellular core network 15, the mobile switching center 26, the BSS 600, the SMSC 702, and the Internet 30.

Figure 13:
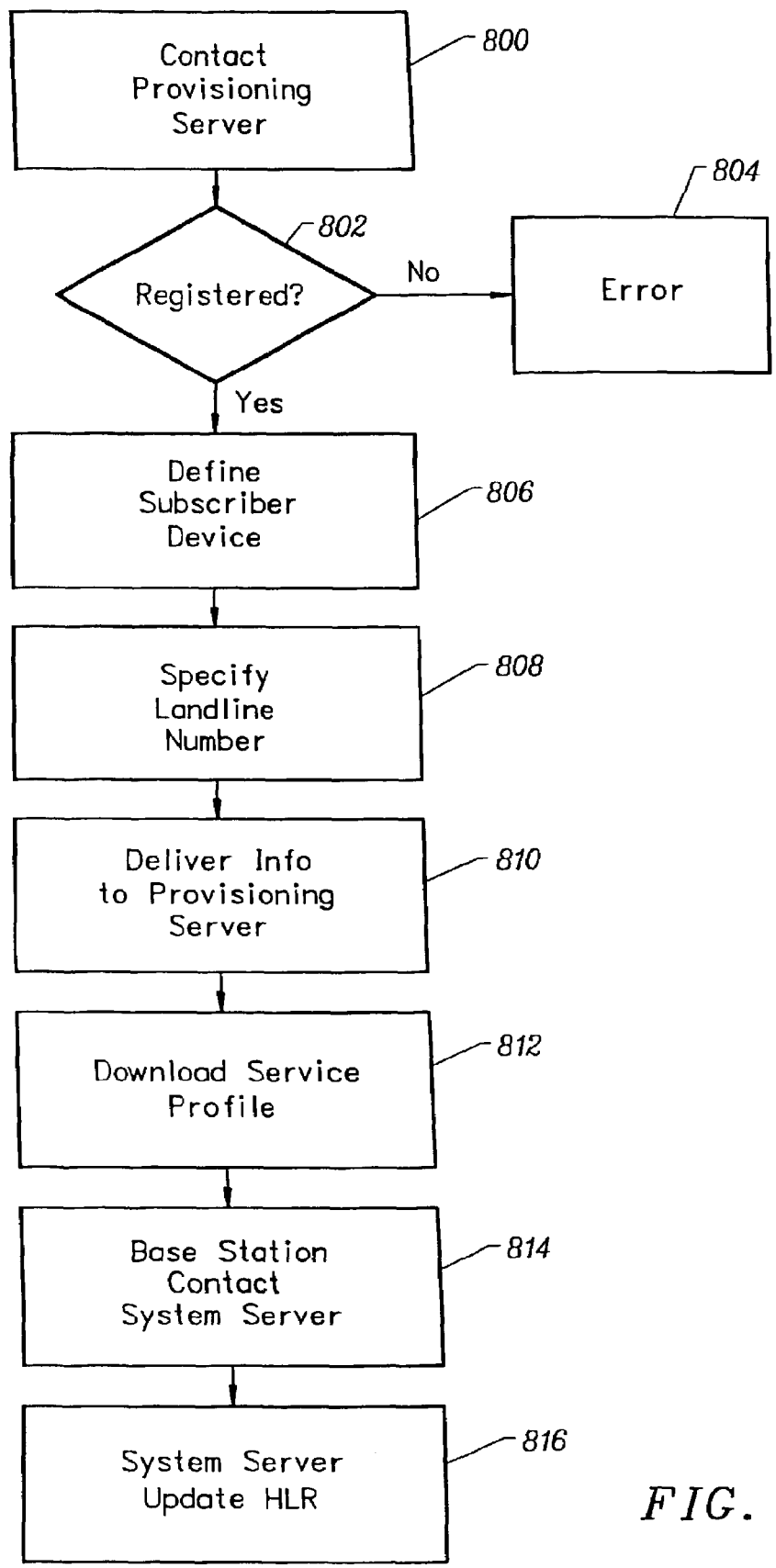
FIG. 13 illustrates provisioning operations performed in accordance with an embodiment of the invention.

FIG. 13 illustrates the process steps involved when the system of FIG. 12 carries out the provisioning process. The process is typically initiated upon installation and activation of a new base station 18, and will be discussed in that context, but those of skill in the art will see that it can be performed any time that provisioning information must be updated.

When a base station 18 is initially powered up it contacts the provisioning server 700 (step 800). In one embodiment, contact is made through the Internet 30 using one or more preprogrammed IP addresses for the provisioning server. Alternately, the provisioning server may be accessed through the SMSC, as discussed above. The base station 18 then identifies itself to the provisioning server 700, for example, using a code preprogrammed at the time of manufacture. If the provisioning server 700 does not recognize the base station, the base station preferably provides an error indication. If the provisioning server 700 recognizes the base station, that processing proceeds to block 806

At this point, the base station broadcasts a signal to the subscriber device 12 instructing it to define itself (block 806). For example, the subscriber device 12 may define itself by sending to the base station 18 an electronic serial number or a portion of an electronic serial number. This defining information is used to establish an association between the base station 18 and the subscriber device 12. This local association is mapped with a local authentication procedure. Thereafter, whenever the subscriber device and the base station come into contact, they identify each other by passing the local authentication procedure. The two devices can only communicate if the local authentication procedure is successful.

The provisioning module 127 of the subscriber device 12 prompts the user to enter the landline telephone number associated with the base station 18 (block 808). This information is then passed to the base station 18. The base station then delivers information to the provisioning server (block 810). For example, the base station will typically deliver the landline telephone number and a base station identification number to the provisioning server. The provisioning server then downloads a service profile to the base station and the system server (block 812). The service profile can include the landline telephone number and caller services, such as call waiting, caller identification, and the like. The service profile may also include an IP address for the base station. The service profile also includes the IP address of a system server 24 assigned to the base station 18. Typically, the system server 24 is selected based upon proximity to the base station, as derived from the area code associated with the landline telephone number.

Observe that the provisioning server operates as a central registration point for all devices within the system. This central point makes it easier to modify system wide services. In addition, the provisioning server provides the benefit that a single address is programmed into each base station.

The base station takes the IP address of the system server from the service profile and contacts the system server (block 814). If the service profiles match, an association is established between the system server, the base station, and the subscriber device. The system server subsequently updates the home location register of the subscriber device with contents of the service profile (block 816). At this point, the authentication process of FIG. 11 would typically be performed. This provisioning process can be repeated whenever a new device 12 or base station 18 is introduced into the system.

Another aspect of the invention allows licensed wireless service users to seamlessly change between a desktop phone and a subscriber device 12 during a call, thus allowing them to use the most comfortable device at a given time. Thus, when a subscriber device 12 is located within a coverage area 16, a user can simply pick up the desktop phone and continue their conversation. The subscriber device 12 can then be disconnected without any interruption in service. In this embodiment, the desktop phone and the base station are connected to the same landline, thereby providing this interchangeability. Likewise, when a caller is using a desktop phone within an area 16, he or she can activate a subscriber device 12 and continue a call from there. In this instance, a button on the subscriber device is used to initiate communication with the base station that is connected to same landline. Subsequently hanging up the desktop phone will not interrupt service.

Attention now turns to an alternate embodiment of the invention illustrating a variation of the handover process described above. This embodiment is more fully appreciated in connection with a specific example in the context of the Global System for Mobile communications (GSM). The GSM standard divides a particular transmission channel into discrete time intervals called data frames, which are further partitioned into time slots. Various time slots are specified as containing control information or user data in specified formats. Specifically, certain time slots are designated as comprising a Slow Associated Control Channel (SACCH), which various cellular hardware is programmed to recognize as containing, among other things, measurement report information indicating the strengths of signals received from various licensed cells.

One embodiment of the invention discloses the use of a previously spare bit within the SACCH to facilitate a handover procedure. This allows the invention to carry out the handover process without requiring changes to any GSM-formatted signals, as described below. The specifics of this process are discussed below in relation to FIGS. 14-16. It should be noted, though, that the invention is not limited to handovers in the GSM, or even the digital cellular, context. Rather, one of skill in the art can see that the invention discloses a method for carrying out handovers of telecommunications sessions supported by any protocol, while maintaining the format of such a protocol. The invention only requires that information triggering such a handover be able to be embedded and recognized within messages sent according to the selected protocol.

Figure 14:
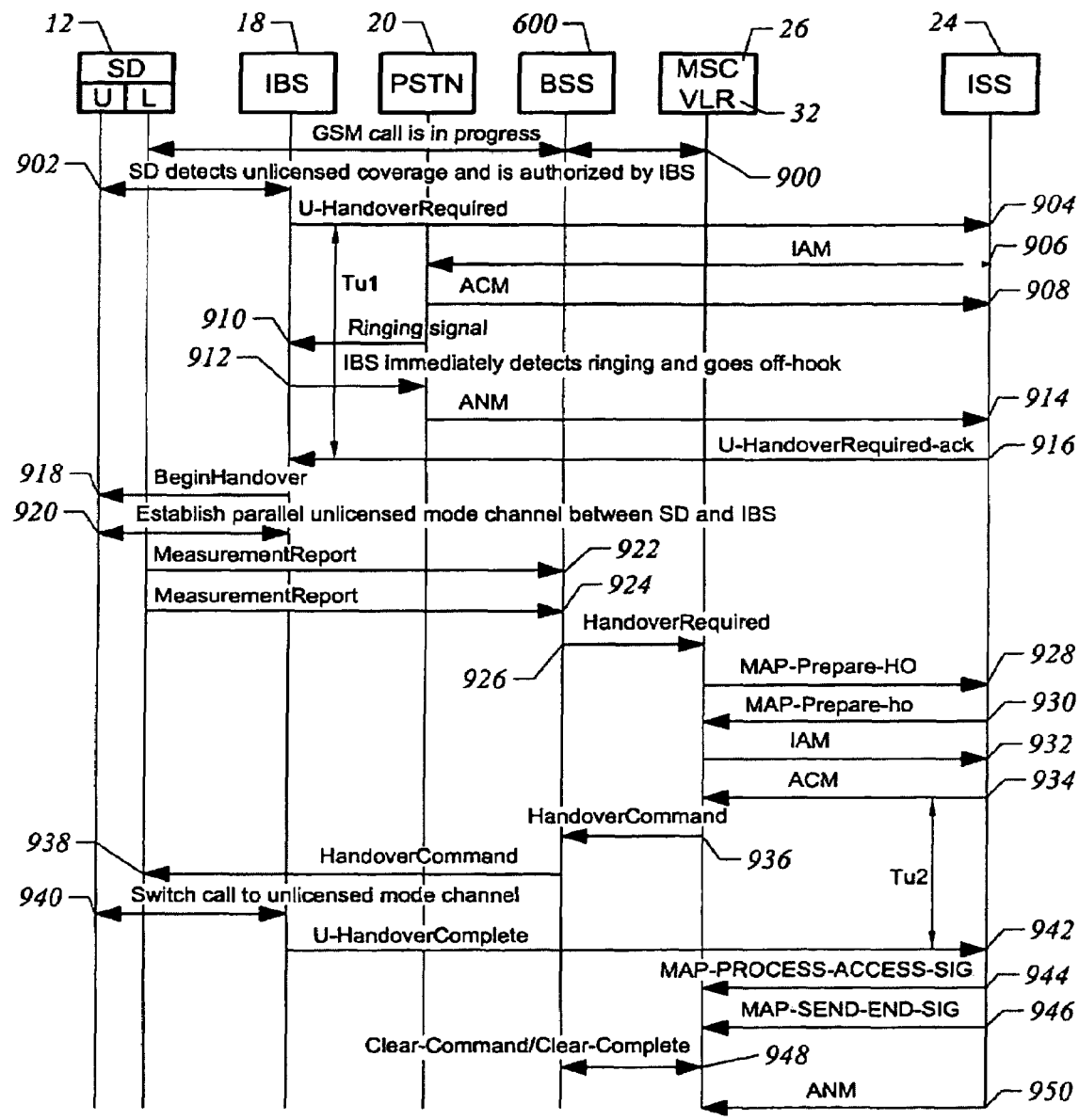
FIG. 14 illustrates further details of licensed to unlicensed handover operations performed in accordance with an embodiment of the invention.

FIG. 14 illustrates the sequence of signals utilized by one aspect of the invention to support a handover from a licensed system to an unlicensed system in the GSM context. When a subscriber device 12 is engaged in a telecommunications session through a licensed wireless system such as a GSM cellular network it is, in normal operation, in constant communication with this network. In this example, the network is represented as a base station subsystem 600. During a typical telecommunications session, the base station subsystem 600 transmits a list of frequencies to the subscriber device 12 over the SACCH, as shown with arrow 900. This list denotes frequencies used by the base station 18, and thus also represents frequencies the subscriber device 12 should scan to determine the possibility of a handover.

In typical cellular networks, a base station subsystem 600 transmits such a list to inform the subscriber device 12 of frequencies at which other regional base station subsystems 600 operate, so as to facilitate handovers between licensed subsystems. In the context of the present invention though, this list additionally includes frequencies at which base stations 18 operate, thus also informing the subscriber device 12 of various unlicensed systems in the area. In operation, base stations 18 provision local base station subsystems 600 with their particular frequency or frequencies. This provisioning is carried out per normal cellular procedures. In this manner, the invention instructs a base station subsystem 600, and thus a subscriber device 12, of the base stations 18 within its region.

This ability to inform subscriber devices 12 of many different base stations 18 yields several distinct advantages. For example, appropriate placement of base stations 18 can extend an unlicensed network's reach into locations such as large buildings or underground structures that licensed network signals are unable to penetrate. To that end, the invention includes an unlicensed network comprising a base station 18 on every floor of a large building or underground garage, thus allowing a subscriber device 12 to function even in elevators or deep underground.

Once the subscriber device 12 wanders into an area covered by a base station 18, its unlicensed wireless circuitry 114 picks up the base station's signal on the frequency it was told to scan (arrow 902). This tells the subscriber device 12 that a base station 18 exists for handover. The subscriber device 12 then identifies itself to the base station 18. Identification and authorization may be performed in accordance with the techniques described in connection with FIG. 11.

After receiving the above information, the base station 18 requests a landline connection by sending a U-HandoverRequired message to its system server 24 via their existing IP connection (arrow 904). The U-HandoverRequired message contains information required for the system server 24 to initiate a landline call to the base station 18, including the IMSI of the subscriber device 12, the PSTN phone number of the base station 18, and the Cell Global Identification (CGI) of the GSM cell currently supporting the licensed call.

The system server 24 then establishes a landline telecommunications channel, typically via the PSTN 20 but alternatively via the Internet 30, with the base station 18 by conventional means. Specifically, the system server 24 transmits an initial address message (IAM) to reserve an idle trunk circuit with the PSTN 20 and place a call to the base station 18 (arrow 906). Assuming the PSTN 20 has an idle circuit available, it reserves the circuit and transmits an address complete message (ACM) indicating a circuit has been reserved (arrow 908). The PSTN then rings the base station 18 (arrow 910), which goes off-hook and answers the call (arrow 912). This triggers the PSTN 20 to transmit an answer message (ANM) to the system server 24 indicating that the landline has been established (arrow 914).

The PSTN having successfully established a call between the system server 24 and base station 18, the system server 24 sends a U-HandoverRequired-Ack message acknowledging the base station 18 and indicating that the handover process may continue (arrow 916). If a predetermined time period $T_{u1}$ has not elapsed, the base station 18 turns off the $T_{u1}$ timer and signals the subscriber device 12 to proceed with handover (arrow 918). The base station 18 and subscriber device 12 then establish an unlicensed mode voice channel between them, in parallel with the licensed mode voice channel currently in operation between the subscriber device 12 and the cellular network 14 (arrow 920). The subscriber device circuitry used to support this parallel communication session is described in connection with FIG. 2.

While this parallel unlicensed mode voice channel must be established prior to handover in order to facilitate seamless call transfer, it should be noted that this step need not be accomplished after the landline call from the PSTN 20 is made. Instead, the unlicensed mode channel can be opened at any time after the subscriber device 12 enters the range of the base station 18, and may simply remain unused until later in the handover process. The step outlined in arrow 920 is shown after arrow 918 simply for convenience; the invention includes its placement at any point after arrow 902 in FIG. 14.

An unlicensed link now exists between the subscriber device 12 and base station 18. The base station 18 and system server 24 are also in communication as shown with arrows 904-916. The unlicensed system is now ready to support the call. The licensed system now must transition the call via the system server 24 to the subscriber device 12 using the newly-established unlicensed link. The subscriber device 12 initiates this process by instructing the licensed system to send the call to the system server 24. In keeping with the GSM standard, the subscriber device 12 transmits a SACCH message to the base station subsystem 600 (arrow 922). This SACCH message includes a previously spare bit, the U-AVAILABLE bit, set to the value "1" (arrow 924). As the U-AVAILABLE bit is otherwise unused according to the GSM standard, setting this bit does not disrupt the GSM format.

The subscriber device 12 also transmits information indicating the frequency at which the base station 18 operates. This frequency information is used to identify the node within the cellular system that services the base station 18. As previously indicated, the system server 24 emulates a mobile switching center 26, while the base station 18 emulates a base station subsystem 600. The system server 24 and the base station 18 service the unlicensed wireless communication system, while emulating components of the licensed wireless communication system. The frequency information is used to bridge the licensed and unlicensed wireless communication systems. In one embodiment, the frequency information is in the form of an Unlicensed Absolute Radio Frequency Channel Number (U-ARFCN). The U-ARFCN makes use of a single, previously unassigned, Absolute Radio Frequency Channel Number (ARFCN).

Preferably, the unlicensed mode system is assigned a globally unique U-ARFCN value, for example the value 501, which is not currently assigned for use by any GSM system. However, it is not necessary that this value be globally unique. For example, the value may be operator-specific, or assigned on a per-base station subsystem 600 basis; however, this embodiment creates U-ARFCN data management overhead.

As discussed below, the frequency information (e.g., the U-ARFCN) is processed by the base station subsystem 600 to identify an Unlicensed Cell Global Identification (U-CGI) value, which corresponds to the system server 24. In this way, the frequency information bridges the licensed and unlicensed wireless communication systems.

The frequency information is sent as part of the SACCH to describe neighbor cells to the base station subsystem 600. As this frequency information is also transmitted according to GSM protocols (here, it is transmitted within the bits that GSM allocates for the SACCH), this embodiment of the invention continues to operate within the GSM format.

In one embodiment, the frequency information is incorporated into the Broadcast Control Channel (BCCH) allocation list, sometimes also referred to as a BA list. Mobile stations that do not support unlicensed mode operation ignore the U-ARFCN value in the BA list.

The subscriber device 12 may also include a maximum received signal quality measurement associated with the U-ARFCN in the measurement report messages that it sends to the base station subsystem 600 on the SACCH. The subscriber device 12 can create a measurement report with only one valid neighbor cell measurement (U-ARFCN) corresponding to the unlicensed system. A base station subsystem 600 with no explicit support for unlicensed mode operation will disregard the U-AVAILABLE bit, but will include the U-ARFCN measurement in its handover algorithm calculations. This initiates the handover to the unlicensed system, particularly when the signal on the serving GSM cell deteriorates.

The value of the U-AVAILABLE bit triggers the base station subsystem 600 to initiate handover to the unlicensed system. The base station subsystem 600 sends a Handover-Required message to the mobile switching center 26 (arrow 926). This message includes an instruction for the mobile switching center 26 to transfer the call to the base station 18. The mobile switching center 26 correlates the U-CGI value with the system server 24. It then sends the system server 24 the IMSI of the subscriber device 12, along with a Mobile Application Part-Prepare-HandOver (MAP-Prepare-HO) command instructing the system server 24 to prepare and execute a handover to the device designated by this IMSI (arrow 928).

In another embodiment, the MAP-Prepare-HO message is used for handover purposes only, and authentication information such as the IMSI is sent in a separate message. However, including the IMSI allows the system server 24 to delay establishing its PSTN call with the base station 18 (arrows 906-914) until the MAP-Prepare-HO message is received. This has the beneficial effect of keeping the PSTN line free until handover has been triggered in the base station subsystem 600 and mobile switching center 26. The invention thus is not limited to the sequence of signals shown in FIG. 14. For example, it also includes embodiments in which the PSTN call to the base station 18, arrows 906-914, is performed after the system server 24 receives a MAP-Prepare-HO message. This is easily accomplished as long as the MAP-Prepare-HO message contains the subscriber's IMSI, so that the system server 24 knows which mobile switching center 26 connection (arrows 932-934) to relate to the landline connection.

The system server 24 transmits a handover reference number identifying the particular call to the mobile switching center 26, which is sent as part of a MAP-Prepare-HO return result message (arrow 930). The mobile switching center 26 then establishes a call to the handover number (arrow 932). The system server 24 returns an address complete message (e.g., an ISUP ACM message). If the system server 24 can correlate the call from the mobile switching center 26 with the call to the base station 18 (i.e., if the IMSI received in the MAP-Prepare-HO invoke message associated with arrow 928 matches the IMSI received as part of the U-HandoverRequired message associated with arrow 904), then the system server 24 internally connects the circuit between the mobile switching center 26 and the base station 18. Otherwise, the system server 24 waits until arrow 942 to connect the two channels.

As shown in FIG. 14, if the system server 24 has not already established the handover, a handover command is sent from the mobile switching center 26 to the base station subsystem 600 (arrow 936). The handover command is then routed from the base station subsystem 600 over the GSM air interface, per normal GSM handover procedures, to the subscriber device 12 (arrow 938).

Recall that, through all this, the subscriber device 12 has maintained its licensed session with the base station subsystem 600. The cellular call is thus now routed to the subscriber device 12 simultaneously through both licensed and unlicensed channels. In other words, the subscriber device 12 receives the same call simultaneously from both the cellular network 14 and the base station 18. The subscriber device 12 carries the call from the cellular network 14 over its licensed wireless circuitry 118, and the call from the base station 18 over its unlicensed wireless circuitry 114. The subscriber device 12 can then seamlessly switch the call by deactivating one set of circuitry, in this case the licensed wireless circuitry 118.

Once the transition is complete, the base station 18 notifies the system server 24 by transmitting a U-HandoverComplete message, including the handover reference number (arrow 942). This provides verification that the handover has been successfully completed.

After completion of the handover, the system server 24 must instruct the cellular network 14 to terminate the licensed session, as it is no longer needed. The system server 24 sends a ProcessAccessSignal message (arrow 944) and a SendEndSignal message (arrow 946) instructing the mobile switching center 26, which are standard signals used by the GSM protocol to terminate a call. In response, the mobile switching center 26 releases the connection to the base station subsystem 600, freeing base station subsystem resources (arrow 948). The system server completes the process by sending a standard ANM signal indicating that the call has been successfully switched to the unlicensed system (arrow 950).

Figure 15:
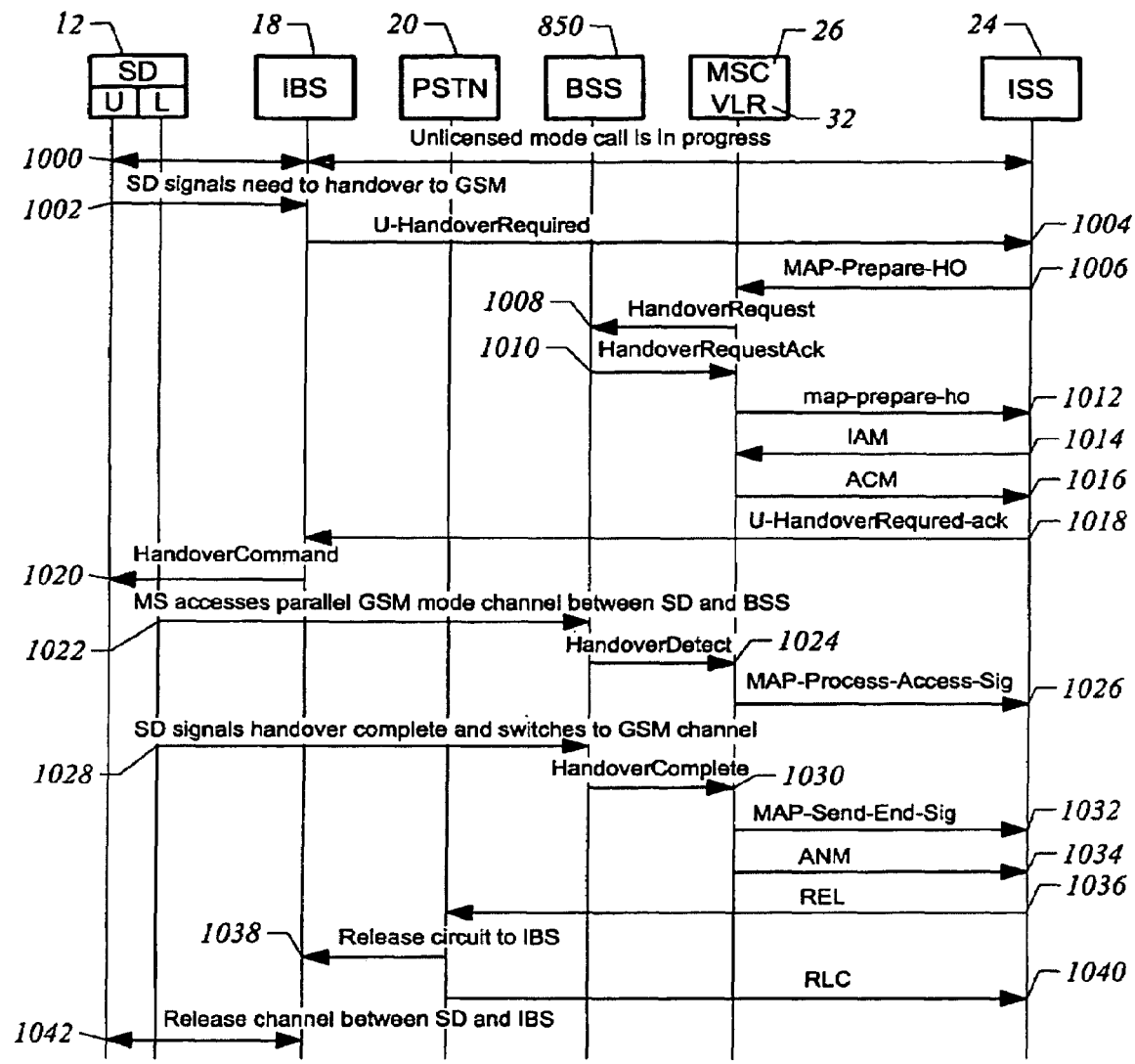
FIG. 15 illustrates further details of unlicensed to licensed handover operations performed in accordance with an embodiment of the invention.

With the handover from licensed to unlicensed systems having been described, attention now turns to describing an embodiment of the handover from unlicensed to licensed systems. FIG. 15 illustrates the sequence of signals utilized by one aspect of the invention to support such a handover in the GSM context. Here, the process begins with the subscriber device 12 involved in a call over an unlicensed system (arrow 1000). As the subscriber device 12 roams away from the base station 18, unlicensed signal strength deteriorates. The subscriber device 12 periodically measures signal strength and, when it drops below a certain level, signals the base station 18 that the call should be handed over to a licensed system (arrow 1002). Alternately, the base station 18 can periodically measure signal strength and appropriately signal the subscriber device 12 when the call should be handed over to the licensed system. This alternate configuration has the advantage of reducing load on the subscriber device 12. The device also identifies an appropriate licensed system by supplying a CGI, which is typically the CGI corresponding to the same system engaged by the device at the time of handover to the unlicensed system.

The base station 18 then instructs the system server 24 to establish a cellular link with the correct base station subsystem 600. It thus sends a U-HandoverRequired message to the system server 24 via their existing IP connection (arrow 1004). This message identifies the specific subscriber device 12 and base station subsystem 600 by including the device's IMSI and the network's CGI, and instructs the system server 24 to establish a connection to the base station subsystem 600.

The system server 24 responds to the U-HandoverRequired message by setting up the appropriate link. As above, this link is established by conventional means. The system server 24 first transmits a Prepare-HO Invoke signal to the mobile switching center 26 identified by the CGI (arrow 1006). This signal instructs the mobile switching center 26 to prepare for handover by establishing a cellular link. The mobile switching center 26 responds by sending a HandoverRequest message to its base station subsystem 600 (arrow 1008). The base station subsystem 600 then transmits back a HandoverRequestAck signal acknowledging the HandoverRequest message and containing frequency and channel number information identifying the cellular line to be established (arrow 1010). The mobile switching center 26 responds by sending the system server 24 a Prepare-HO Return Result message acknowledging the original Prepare-HO message and containing the handover number (arrow 1012). The system server 24 then establishes a call to the handover number with an LAM message to the mobile switching center 26 (arrow 1014). Once the mobile switching center 26 reserves the circuit corresponding to the handover number, it sends back an ACM message, whereupon the system server 24 can connect this circuit to the current unlicensed call in progress (arrow 1016).

At this point, a live cellular link is available to the system server 24; the call must now be transferred from the unlicensed system to this licensed link. The system server 24 begins this task by sending a U-HandoverRequired-ack signal back to the base station 18 (arrow 1018), which acknowledges the original U-HandoverRequired signal and also contains the HandoverCommand message necessary to instruct the subscriber device 12 to transition the call. The base station 18 then wirelessly transmits this HandoverCommand to the subscriber device 12 (arrow 1020). The subscriber device 12 opens a GSM channel with the appropriate base station subsystem 600, creating a licensed channel to carry the same conversation in parallel with the current unlicensed channel (arrow 1022).

The subscriber device 12 is now operating both a licensed channel and an unlicensed channel in parallel, and must transition the call over. Before this happens, the base station subsystem 600 sends a HandoverDetect signal to the mobile switching center 26 (arrow 1024). This in turn triggers the mobile switching center 26 to send a ProcessAccessSignal invoke signals to the system server 24 (arrow 1026), where both signals are sent according to standard GSM protocol.

The subscriber device 12 then switches to the licensed channel and sends the base station subsystem 600 a HandoverComplete signal (arrow 1028). The transition complete, the landline is no longer necessary and all that remains is to switch it off. The base station subsystem 600 relays the HandoverComplete signal to the mobile switching center 26 (arrow 1030), which then sends a SendEndSig message to the system server 24, per normal GSM procedures, telling it to send an end signal message to the subscriber device 12 (arrow 1032). The mobile switching center 26 also completes its call to the system server 24 by sending an ANM message (arrow 1034). The system server 24 next sends a standard release message (REL) signal directing the PSTN 20 to release the circuit to the base station 18 (arrow 1036). Once the PSTN 20 does so (arrow 1038), it transmits a release complete (RLC) message to the system server 24 (arrow 1040). The subscriber device 12 also terminates the last link in the landline chain by releasing the unlicensed channel to the base station 18 (arrow 1042).

As above, the preceding has described an embodiment in which the system server 24 emulates a GSM mobile switching center, yet alternate embodiments exist in which the system server 24 and base station 18 can also emulating a GSM base station subsystem. Such alternate embodiments can utilize the steps of FIG. 15, with modifications to the signals between the mobile switching center 26 and system server 24.

The transition from unlicensed to licensed systems having been described, attention now shifts back to the transition from licensed to unlicensed systems. Note that the latter transition implemented the concept of utilizing previously-unused portions of the control signal to facilitate the handover process. Further details of this concept are now given, with emphasis on the GSM context. As above, the invention should not be construed as limited to this context; nevertheless, this further explanation is helpful in more fully illustrating the general concept of the invention.

Figure 16:
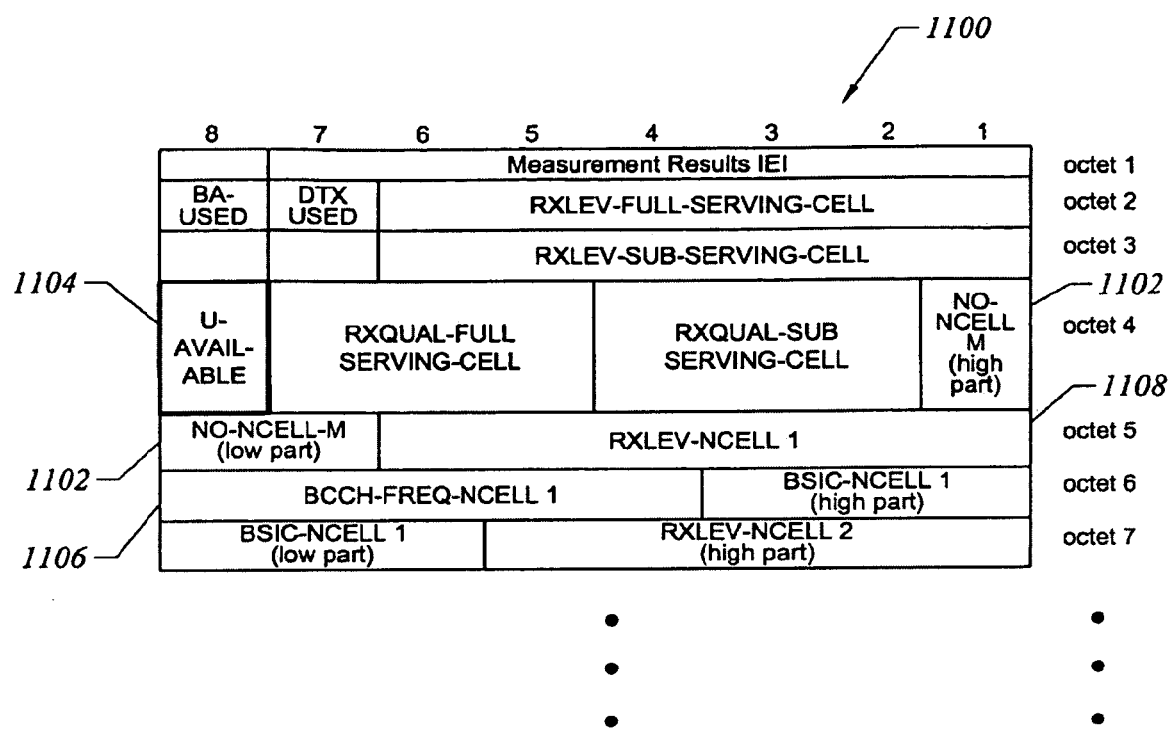
FIG. 16 illustrates a portion of a measurement report arranged in accordance with an embodiment of the invention.

FIG. 16 is a graphical illustration of a portion 1100 of an SACCH message that can be used to illustrate one embodiment of the invention. Shown is the format of such a message, as specified by the GSM standard and organized into bytes, or octets of binary data. For example, the NO-NCELL-M grouping 1102 consists of high and low parts, and comprises three bits containing the number of neighbor cells measured. In the standard GSM context, the NO-CELL-M grouping 1102 communicates the number of neighboring licensed cellular systems measured, while in the context of the invention the grouping denotes the number of neighboring base stations 18.

The highlighted U-AVAILABLE bit 1104 is unused by the current GSM protocols. This bit can therefore be used to convey information within the GSM protocol. Thus, current GSM cellular networks 14 can be programmed to initiate a handover procedure upon receiving a U-AVAILABLE bit 1104 set to a predetermined value (e.g., a digital one). Also, as other portions of the SACCH are used to relay all the information necessary for achieving such a handover, the methods of the invention can be used to achieve handovers with little or no disruption to the format of GSM-compliant signals. For instance, as above, the NO-CELL-M grouping 1102 can be used to relay the number of neighboring cells, or base stations 18. In addition, while the BCCH-FREQ-NCELL1 1106 typically relays the frequency of a neighboring cell, it can be used by one embodiment of the invention to relay the frequency of a neighboring base station 18. Finally, the RXLEV-NCELL1 grouping 1108 typically relays the signal strength of a neighboring cell, but can be used by one embodiment of the invention to relay the signal strength of a nearby base station 18.

This embodiment of the invention requires that prior art cellular networks 14 be programmed to recognize the U-AVAILABLE bit 1104. Another embodiment of the invention allows the SACCH to convey handover information without using the U-AVAILABLE bit 1104. Currently, cellular networks 14 are programmed to recognize various components of the SACCH signal as describing the identity and signal strength of neighbor cells. When the signal strength of these cells reaches a certain magnitude, the network is programmed to hand the call over to the neighbor. By programming the various components of the invention to emulate a neighbor cell, current cellular networks can practice the invention without any changes; both cellular networks 14 and the format of the SACCH remain unchanged from their current configurations.

The preceding has described an embodiment in which the system server 24 facilitates handovers by emulating a GSM mobile switching center. However, it should be noted that alternate embodiments exist in which the system server 24 and base station 18 can also facilitate handovers by emulating a GSM base station subsystem. In the licensed-to-unlicensed handover context, such alternate embodiments can utilize the steps of FIG. 14, with modifications to the signals between the mobile switching center 26 and system server 24 (arrows 928-934, 944-946, and 950). Similarly, unlicensed-to-licensed handovers can utilize the steps of FIG. 15 with various modifications.

One such alternate embodiment is described in reference to FIG. 14. In the following discussion, reference to specific arrow numbers indicates a change to that arrow number in FIG. 14. Here, the mobile switching center 26 transmits a HandoverRequest signal to the system server 24 (arrow 928), which is acknowledged by a HandoverRequestAck signal sent back (arrow 930). The handover request having been received and acknowledged, no need exists for the IAM and ACM signals (arrows 932-934), which are deleted Once these altered signals are sent, handover proceeds as described previously, with the mobile switching center 26 issuing a handover command (arrow 936) that ultimately prompts the subscriber device 12 to switch the call to the unlicensed mode channel (arrow 940), and notify the system server 24 that handover is complete (arrow 942). The system server 24 then sends a HandoverDetect signal to the mobile switching center 26 (arrow 944), indicating a handover has been detected, as well as a HandoverComplete signal (arrow 946). An ANM signal (arrow 950) need not be sent in such an embodiment.

Figure 17:
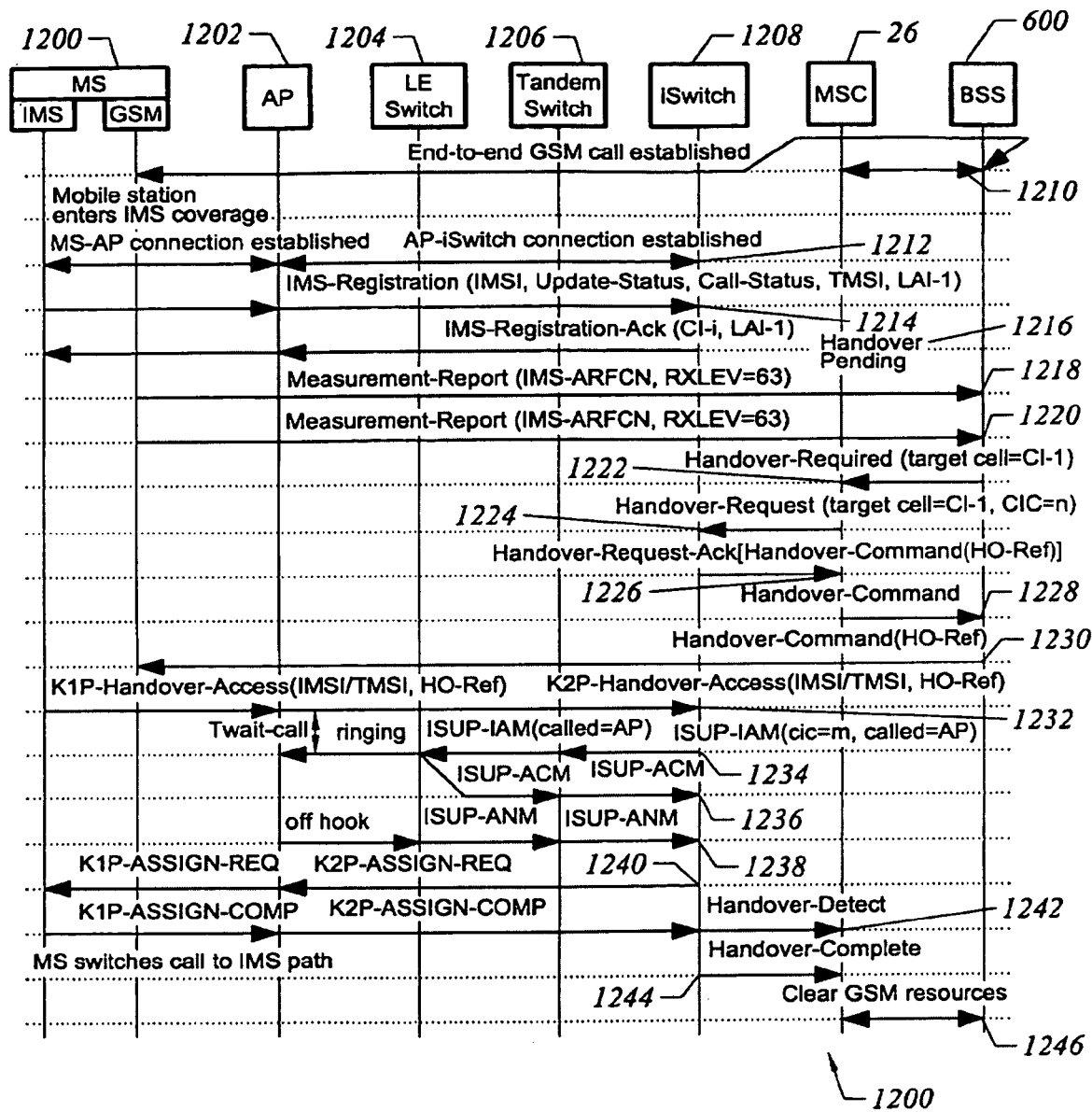
FIG. 17 illustrates further details of licensed to unlicensed handover operations performed in accordance with an embodiment of the invention.

Another such alternate embodiment is described in FIG. 17. Here, physical components are described using terms commonly utilized in the GSM context, but which are analogous to the components of FIG. 14. Specifically, the subscriber device 12 is here described as a mobile station 1200, the base station 18 is termed an access point 1202, the PSTN 20 is represented by an LE switch 1204 and a tandem switch 1206 which are two common PSTN components, and the system server 24 is referred to as an iSwitch 1208. The mobile switching center 26 and base station subsystem 600 retain their nomenclatures.

The processes of this alternate embodiment are analogous to those of FIG. 14, with handover from licensed (GSM) to unlicensed service facilitated by the setting of values within the measurement report sent from the mobile station 1200 to the base station subsystem 600. When a mobile station 1200 is engaged in a GSM voice call (arrow 1210) and wanders into an unlicensed coverage area, secure links are established between the mobile station 1200 and the access point 1202, and between the access point 1202 and iSwitch 1208 (arrow 1212). Once the links are established, the mobile station 1200 transmits an IMS-REGISTRATION message to the iSwitch 1208 containing its identification information and requesting handover (arrow 1214). Once the iSwitch 1208 authenticates the mobile station 1200 per previously described methods, it returns an IMS-REGISTRATION-ACK message acknowledging the mobile station 1200 and containing information for describing the access point 1202 as a target cell to another base station subsystem 600 (arrow 1216). In the GSM context, this information typically includes a cell identity (CI) and location area identity (LAI). The iSwitch 1208 also marks its subscriber record as handover pending.

The mobile station 1200 receives the IMS-REGISTRATION-ACK message from the access point 1202 and begins including in its SACCH transmissions the ARFCN value of the access point 1202, along with a received signal quality value set to 63 (i.e., maximum), (arrows 1218-1220). This triggers the base station subsystem 600 to begin its handover operations.

The base station subsystem 600 then sends a HANDOVER-REQUIRED message to the mobile switching center 26, including the CI and LAI it has received (arrow 1222). The correct iSwitch 1208 thus identified, the mobile switching center 26 transmits a HANDOVER-REQUEST message to the iSwitch 1208 that includes the identity of the circuit to be used in the handover (arrow 1224). The mobile switching center 26 may also include the identity of the mobile station 1200. The iSwitch 1208 selects an unused handover reference value HO-Ref, and stores it along with the target cell information. The iSwitch 1208 then transmits a HANDOVER-REQUEST-ACK message back to the mobile switching center 26 containing a command directing the mobile station 1200 to switch to the unlicensed channel (arrow 1226). The mobile switching center 26 passes this command to the base station subsystem 600 (arrow 1228) for relay to the mobile station 1200 (arrow 1230).

So instructed, the mobile station 1200 transmits a K2P-HANDOVER-ACCESS message to the iSwitch 1208 acknowledging receipt of the handover command (arrow 1232). This message also initiates the opening of a PSTN link between the iSwitch 1208 and access point 1202 (arrows 1234-1238), which is established as in arrows 904-914 of FIG. 14. Once this unlicensed PSTN link is established, the iSwitch 1208 instructs the mobile station 1200 to switch the call to its unlicensed circuitry 114 using a K2P-ASSIGN-REQ command (arrow 1240). Upon receiving this command, the mobile station 1200 switches to the unlicensed call and transmits a K2P-ASSIGNMENT-COMPLETE message back to the iSwitch 1208 acknowledging so (arrow 1242). No longer necessary, the licensed call is terminated to free up GSM resources (arrows 1244-1246).

Figure 18:
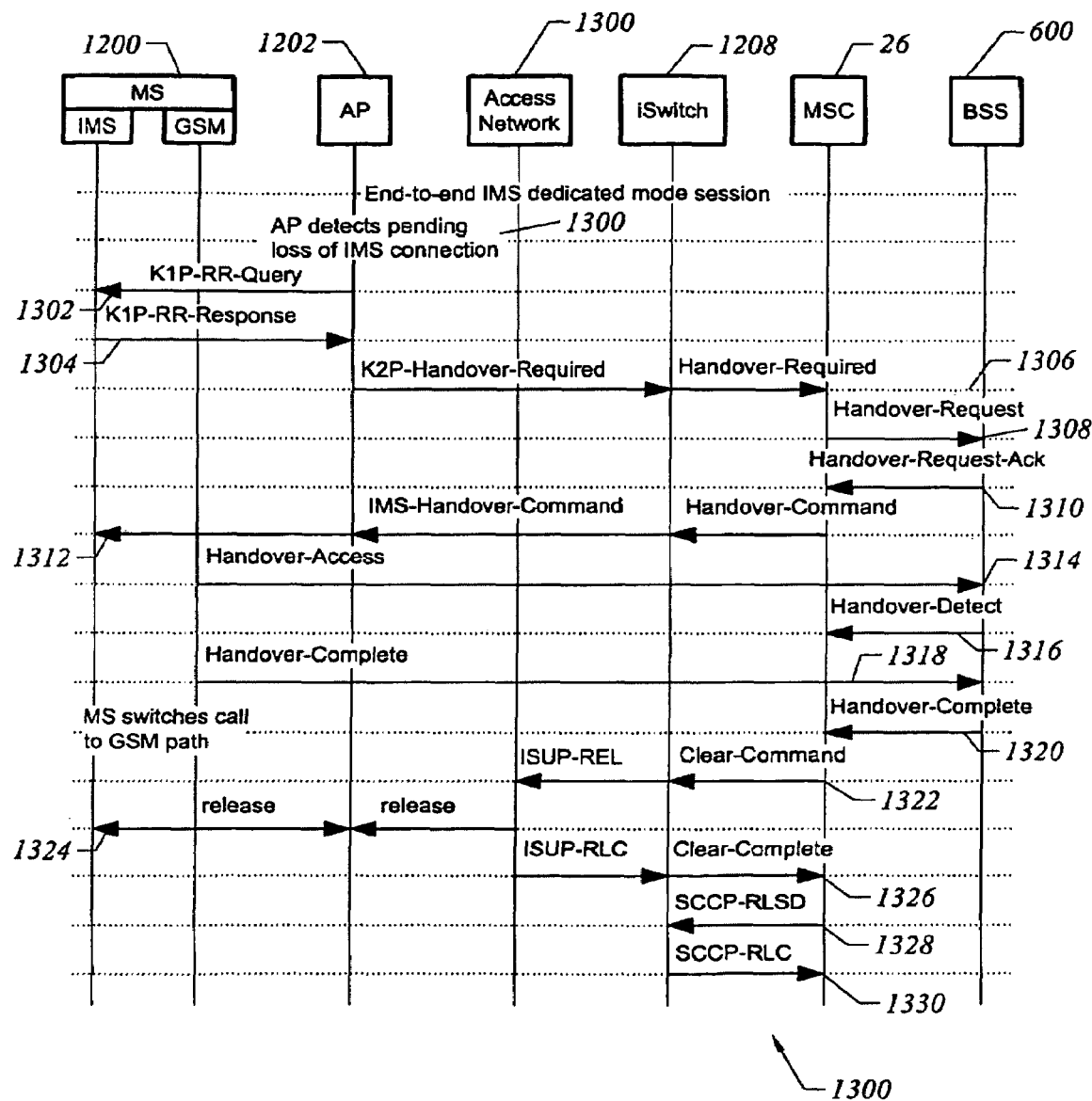
FIG. 18 illustrates further details of unlicensed to licensed handover operations performed in accordance with an embodiment of the invention.

FIG. 18 illustrates steps employed in another alternate embodiment. This embodiment utilizes an iSwitch 1208 that emulates a GSM mobile switching center to execute unlicensed-to-licensed handovers. In the following steps, similarity can be seen to the steps of FIG. 15. When a mobile station 1200 is engaged in an unlicensed-mode call and the access point 1202 detects pending loss of a licensed connection due to deterioration of unlicensed signal strength (step 1300), it sends a KIP-RR-QUERY message to the mobile station 1200 indicating that a handover to a licensed system is required (arrow 1302). This message includes the identity of a nearby GSM cell, if available. The mobile station responds with a KIP-RR-RESPONSE message (arrow 1304), prompting the access point 1202 to send a message to the nearby mobile switching center 26 indicating that a handover is required (arrow 1306).

So instructed, the mobile switching center 26 requests a handover from the appropriate base station subsystem 600 (arrow 1308), which responds with a return message acknowledging the request (arrow 1310). This return message contains a GSM HANDOVER-COMMAND and possesses information identifying the GSM resources that the mobile station 1200 is to link to. This message and information are passed on to the mobile station 1200 (arrow 1312), which begins transmitting handover access bursts to the base station subsystem 600 via its licensed wireless circuitry 118 (arrow 1314). Upon detecting these bursts, the base station subsystem 600 completes a new licensed wireless link to the mobile station 1200 and returns a HANDOVER-DETECT message to the mobile switching center 26 (arrow 1316). A licensed channel now open, the mobile station 1200 switches the call to its licensed wireless circuitry 118 and transmits a HANDOVER-COMPLETE message to the base station subsystem 600 (arrow 1318), which is mirrored to the mobile switching center 26 (arrow 1320).

Having detected a successful handover, the mobile switching center 26 sends a CLEAR-COMMAND requesting release of the now-unused PSTN resources (arrow 1322), which prompts the PSTN 20 and access point 1202 to release their call to the mobile station 1200 (arrow 1324). Once the call is released, the PSTN notifies the iSwitch 1208, spurring it to notify the mobile switching center 26 (arrow 1326). The call between the iSwitch 1208 and mobile switching center 26 is then also released (arrows 1328-1330).

The foregoing description, for purposes of explanation, used specific nomenclature to provide a thorough understanding of the invention. However, it will be apparent to one skilled in the art that the specific details are not required in order to practice the invention. In other instances, well known circuits, systems and devices are shown in block form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed: obviously, many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

The invention claimed is:

1. A mobile station comprising:
    a) a first wireless interface to access an unlicensed wireless communication network via an unlicensed wireless base station using an unlicensed radio frequency;
    b) a second wireless interface to access a licensed wireless communication network using a licensed radio frequency;
    c) a third interface to communicate with an unlicensed wireless network controller communicatively coupled to the base station via a broadband network;
    d) circuits for handling a first set of messages transmitted over the second interface, the first set of messages comprising a measurement report sent to the licensed wireless communication network over the second interface, wherein the measurement report includes an Absolute Radio Frequency Channel Number (ARFCN) that is associated with the unlicensed wireless communication network and an indication that a cell associated with the unlicensed wireless communication network has a maximum signal quality; and
    e) circuits for handling a second set of messages transmitted over the third interface to support handover of a communication session from the licensed wireless communication network to the unlicensed wireless communication network.

2. The mobile station of claim 1, wherein the first set of messages comprises a handover command message received at the mobile station from the licensed wireless communication network, the handover command for indicating that a handover of the communication session is required.

3. The mobile station of claim 1, wherein the second set of messages comprises a handover access message sent from the mobile station to the network controller.

4. The mobile station of claim 3, wherein the handover access message is for causing the network controller to initiate traffic channel assignment for handover of the communication session.

5. The mobile station of claim 1, wherein the second set of messages comprises a handover complete message sent from the mobile station to the network controller.

6. The mobile station of claim 1, wherein said maximum signal quality is indicated by setting a value of 63 for a receiving level.

7. A computer readable medium storing a computer program for execution by a mobile station, the computer program for performing a handover of a communication session from a licensed wireless communication network to an unlicensed wireless communication network comprising a network controller, the computer program comprising sets of instructions for:

a) establishing a communication session using the licensed wireless network servicing a licensed wireless service area;
b) establishing a connection between the mobile station and the unlicensed wireless communication network through the network controller;
c) sending a measurement report from the mobile station to the licensed wireless communication network, wherein the measurement report includes an Absolute Radio Frequency Channel Number (ARFCN) that is associated with the unlicensed wireless communication network and an indication that a cell associated with the unlicensed wireless communication network has a maximum signal quality; and
d) receiving a command at the mobile station from the licensed wireless communication network indicating that a handover to the unlicensed wireless network is required.

8. The computer readable medium of claim 7, wherein the computer program further comprises a set of instructions for sending a handover access message to the network controller.

9. The computer readable medium of claim 7, wherein the computer program further comprises a set of instructions for sending a handover complete indication to the network controller.

10. The computer readable medium of claim 7, wherein said maximum signal quality is indicated by setting a value of 63 for a receiving level.

11. The computer readable medium of claim 7, wherein the computer program further comprises a set of instructions for switching the communication session from the licensed wireless network to the established connection to the unlicensed wireless network.

12. A method of performing a handover of a communication session from a licensed wireless communication network to an unlicensed wireless communication network comprising a network controller, the method comprising:
    establishing a communication session using the licensed wireless network servicing a licensed wireless service area;
    establishing a connection between a mobile station and the unlicensed wireless communication network through the network controller;
    sending a measurement report from the mobile station to the licensed wireless communication network, wherein the measurement report includes an Absolute Radio Frequency Channel Number (ARFCN) that is associated with the unlicensed wireless communication network and an indication that a cell associated with the unlicensed wireless communication network has a maximum signal quality; and
    receiving a command at the mobile station from the licensed wireless communication network indicating that a handover to the unlicensed wireless network is required.

13. The method of claim 12 further comprising sending a handover access message to the network controller.

14. The method of claim 12 further comprising sending a handover complete indication to the network controller.

15. The method of claim 12, wherein said maximum signal quality is indicated by setting a value of 63 for a receiving level.

16. The method of claim 12 further comprising switching the communication session from the licensed wireless network to the established connection to the unlicensed wireless network.

* * * * *